United States Patent [19]

Ishibashi et al.

[11] Patent Number: 5,596,663
[45] Date of Patent: Jan. 21, 1997

[54] FIBER OPTIC MODULE

[75] Inventors: Shin Ishibashi; Hideyuki Nagao; Tomiya Miyazaki, all of Fukuoka, Japan

[73] Assignee: Matsushita Electric Industrial Co., Ltd., Kadoma, Japan

[21] Appl. No.: 372,078

[22] Filed: Jan. 12, 1995

[30] Foreign Application Priority Data

Apr. 25, 1994 [JP] Japan ..................... 6-086691

[51] Int. Cl.$^6$ ................. G02B 6/00; G02B 6/36
[52] U.S. Cl. ................. 385/92; 361/785
[58] Field of Search ................. 361/785, 760, 361/761, 783; 385/88–94

[56] References Cited

U.S. PATENT DOCUMENTS

| | | | |
|---|---|---|---|
| 4,129,349 | 12/1978 | von Roesgen | 361/785 |
| 4,149,072 | 4/1979 | Smith et al. | 250/199 |
| 4,291,943 | 9/1981 | Binek et al. | 350/96.2 |
| 4,595,839 | 6/1986 | Braun et al. | 250/551 |
| 5,111,363 | 5/1992 | Yagi et al. | 361/398 |
| 5,202,943 | 4/1993 | Carden et al. | 385/92 |
| 5,295,214 | 3/1994 | Card et al. | 385/92 |
| 5,416,871 | 5/1995 | Takahashi et al. | 385/92 X |

FOREIGN PATENT DOCUMENTS

| | | |
|---|---|---|
| 437161 | 7/1991 | European Pat. Off. |
| 624962 | 11/1994 | European Pat. Off. |
| 3-218134 | 9/1991 | Japan |
| 2087681 | 5/1982 | United Kingdom |

*Primary Examiner*—Akm E. Aullah
*Attorney, Agent, or Firm*—Spencer & Frank

[57] ABSTRACT

A fiber optic module includes a connector connected to a mother board of a host computer, an LD semiconductor IC for converting serial data received from the mother board to an LD electric signal for a laser diode, an LD module for converting the LD electric signal to an LD optical signal, a PD module for converting a photodiode optical signal to a PD electric signal, a PD semiconductor IC for converting the PD electric signal to PD serial data, a circuit board having the connector and carrying LD semiconductor IC and PD semiconductor IC, an LD shielding plate and a PD shielding plate for electrically shielding the LD module and the PD module, respectively, a first frame and a second frame for holding the circuit board, LD module and PD module. In the fiber optic module, the connector is of a surface mounting type, leads of the LD and PD modules are connected to a side of the circuit board mounted with the connector, the circuit board has an LD variable resistor for adjusting a drive current of the LD module, the LD variable resistor is provided to a side of the circuit board opposite to the connector, the circuit board has a PD variable resistor provided to the side of the circuit board opposite to the connector for detecting a signal of the PD module, 3 signal processing semiconductor ICs or less are provided.

58 Claims, 18 Drawing Sheets

FIBER OPTIC MODULE

BACKGROUND OF THE INVENTION

The present invention relates to a fiber optic module which can be used in such a device as to perform data transfer between apparatuses.

There has been so far known such a fiber optic module as shown in FIGS. 17–19 (disclosed in JP-A-3218134). FIG. 17 is a plan view of a prior art fiber optic module which comprises laser diode (LD) modules 1 for transmitting an optical signal onto a printed circuit board 3 having a width of 76 mm and a length of 75 mm, photodiode (PD) modules 2 for receiving the optical signal, semiconductor ICs 4 and 5 for converting the optical signal into an electric signal, and a connector 6 for transfer of the electric signal to a mother board (not shown in the drawing).

FIG. 18 is a cross-sectional view of a major part of a lower frame for the prior art fiber optic module. The prior art fiber optic module is fixed to the mother board (not shown) by means of a spacer 8 and a J-letter shaped clip 9 both formed in a lower frame 7b.

FIG. 19 is a cross-sectional view showing a holding mechanism of the prior art fiber optic module to be held to the circuit board. More specifically, the circuit board 3 is inserted into a rear part of the lower frame 7b and then held by the upper and lower frames 7a and 7b.

However, the above prior art has had several problems which follow.

1) The electric signals are transferred on a parallel data basis, and then even though each of parallel signals consists of, e.g., 8 bits, the number of signal lines transferring the parallel signals as well as other signals becomes as many as 50, which requires the large size of connectors and semiconductor ICs for serial/parallel conversion, which results in that the size of the entire unit must be inevitably made large. Further, not only the large size of this unit per se goes against a recent tendency of the rapid downsizing movement of host computer but this also largely limits the design flexibility of mother board for system manufacturers.

2) The fixation between the fiber optic module and mother board in the prior art is effected by means of the J-letter shaped clip 9 in the form of a resin leg extended from the lower frame 7b as already explained in connection with FIG. 18. This requires a large hole as an opening for fixation in the mother board, whereby the design flexibility of the mother board by the system manufacturer is largely limited. Further, since the prior art has such a structure that a load caused by the force derived by mounting and dismounting of the optical fiber is applied to the J-letter shaped clip 9 and the lead (not shown) of the connector 6, this causes a breakage of the J-letter shaped resin-clip 9 made from resin or a poor connection of the connector lead, with the result of reduction in the reliability of the fiber optic module.

Furthermore, for the purpose of avoiding any stress applied to the leads of the LD modules 1 and PD modules 2, the accuracy of each of the parts must be increased and thus parts management (such as parts acceptance inspection) becomes necessary, which make it difficult to obtain a low-cost fiber optic module.

3) The prior art fiber optic module is fixed by soldering the connector 6 to the circuit board 3 and thereafter the signal lines of the connector 6 are directly connected to the mother board by soldering. The necessity of these works hinders realization of a low-cost fiber optic module.

4) In the method for holding the circuit board 3 as shown in FIG. 19, a warpage occurs in the circuit board 3, which remarkably deteriorates the reliability of the circuit board 3. Further, the holding method shown in FIG. 19 requires a sufficient length of the circuit board 3 itself and a sufficient circuit-board holding length L, which hinders realization of a miniaturized fiber optic module.

5) Since most area of the circuit board 3 is in its exposed state, when a worker handles the prior art fiber optic module or a user mounts the prior art fiber optic module onto the mother board, the prior art fiber optic module is susceptible to electrostatic destruction, which leads to poor reliability and costliness of the fiber optic module.

6) During a long-term storage, dust or foreign matter invades into the LD and PD modules into which optical fibers are to plug, which causes improper or poor connection between the optical fiber and the module, thus resulting in remarkable reduction in the reliability of the fiber optic module.

SUMMARY OF THE INVENTION

It is accordingly an object of the present invention to provide a fiber optic module which can solve the above problems in the prior art and can be made compact in size, high in the design flexibility of mother board, low in cost and high in reliability.

In accordance with an aspect of the present invention, the above object is attained by providing a fiber optic module which includes a connector connected to a mother board of a host computer, an LD semiconductor IC for converting serial data received from the mother board to an LD electric signal for a laser diode, an LD module for converting the LD electric signal to an LD optical signal, a PD module for converting a photodiode optical signal to a PD electric signal, a PD semiconductor IC for converting the PD electric signal to PD serial data, a circuit board having the connector and carrying LD semiconductor IC and PD semiconductor IC, an LD shielding plate for electrically shielding the LD module, a PD shielding plate for electrically shielding the PD module, a first frame for holding the circuit board, LD module and PD module, and a second frame for holding the circuit board, LD module and PD module. In the fiber optic module, the connector may be of a surface mounting type, leads of the LD and PD modules may be connected to a side of the circuit board mounted with the connector, the circuit board may have an LD variable resistor for adjusting a drive current of the LD module, the LD variable resistor may be provided to a side of the circuit board opposite to the connector, the circuit board may have a PD variable resistor for detecting a signal of the PD module, the PD variable resistor may be provided to the side of the circuit board opposite to the connector, 3 signal processing semiconductor ICs or less may be provided, an outline configuration of the circuit board may measure 17 mm through 25.4 mm wide and 30 mm through 50 mm long, the outline dimensions of the fiber optic module may be 19 mm through 25.4 mm wide, 45 mm through 65 mm high and 9 mm through 25.4 mm high, the second frame may be provided with pawls for coupling of the optical signal, the first frame may be provided with projections for protecting the pawls, the first and second frames may be made of resin material, the first and second frames may have means for holding the circuit board, the holding means may be a snap-fit mechanism, a tipmost end of the circuit board may be held by the first and second frames, the first frame may have an arm, a recess

DESCRIPTION OF THE PREFERRED EMBODIMENTS

Figure 1:
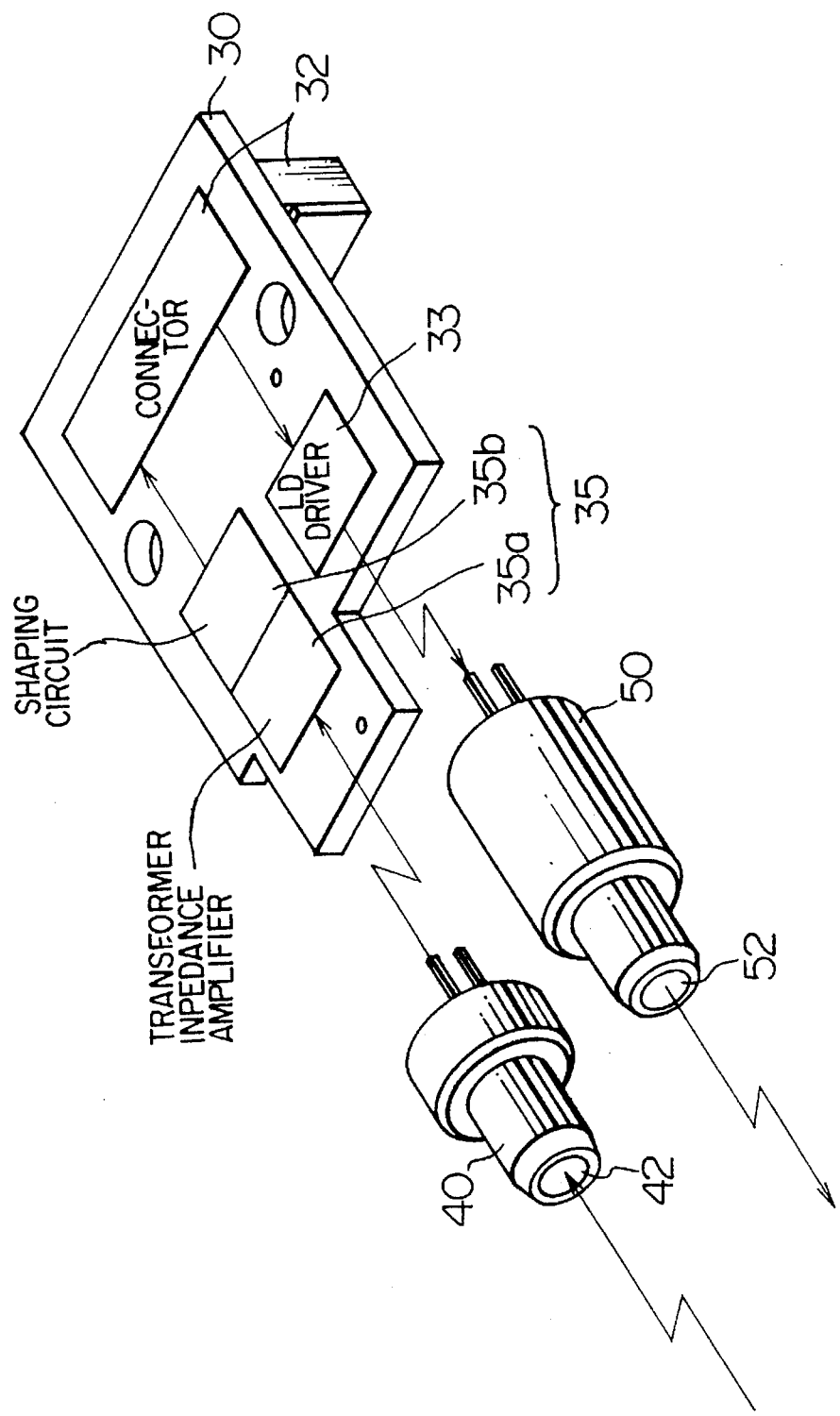
FIG. 1 is a perspective view, in a block diagram form, of a fiber optic module in accordance with a first aspect of the present invention.

The present invention will be explained with reference to the accompanying drawings, in which parts having the same reference numerals represent identical parts.

Referring first to FIG. 1, there is shown a block diagram of a fiber optic module in accordance with a first aspect of the present invention. In FIG. 1, a printed circuit board (which will be referred to as the PCB, hereinafter) 30 functions to send an electric signal (serial data) received at a PCB connector 32 to a laser diode (LD) driver 33 to drive an LD element (not shown and refer to FIG. 8) located within an LD module 50 and to transmit the data in the form of an optical signal to an optical fiber (ferule: not shown) inserted in an opening 52 of the LD module 50. A photodiode (PD) module 40, on the other hand, receives an optical signal from an optical fiber (not shown) inserted in an opening 42 of the PD module 40, converts the optical signal to a current through a PD element (not shown: refer to FIG. 8), and sends the current to a transformer impedance amplifier part 35a of an amplifier 35 in the form of a semiconductor IC for conversion of the current to a voltage. Further, the optical analog signal in the form of the voltage is converted by a shaping circuit part 35b into a digital signal and transmitted as serial data to the mother board through the PCB connector 32. With the fiber optic module of the present invention, since transfer of an electric signal is carried out in the form of serial data, the PCB connector 32 requires only about 22 of signal lines. That is, not only the size of the PCB connector 32 itself can be made highly compact but the PCB 30 can also be made compact, which results in that the fiber optic module can realize reliable data transmission with a speed as high as above 130 Mbits/s. In this connection, although the amplifier 35 has been made in the form of a single semiconductor IC in the first aspect of the present invention, the transformer impedance amplifier part 35a may be made separately from the shaping circuit part 35b respectively as a single semiconductor IC with substantially the same effects as the above case.

Figure 20:
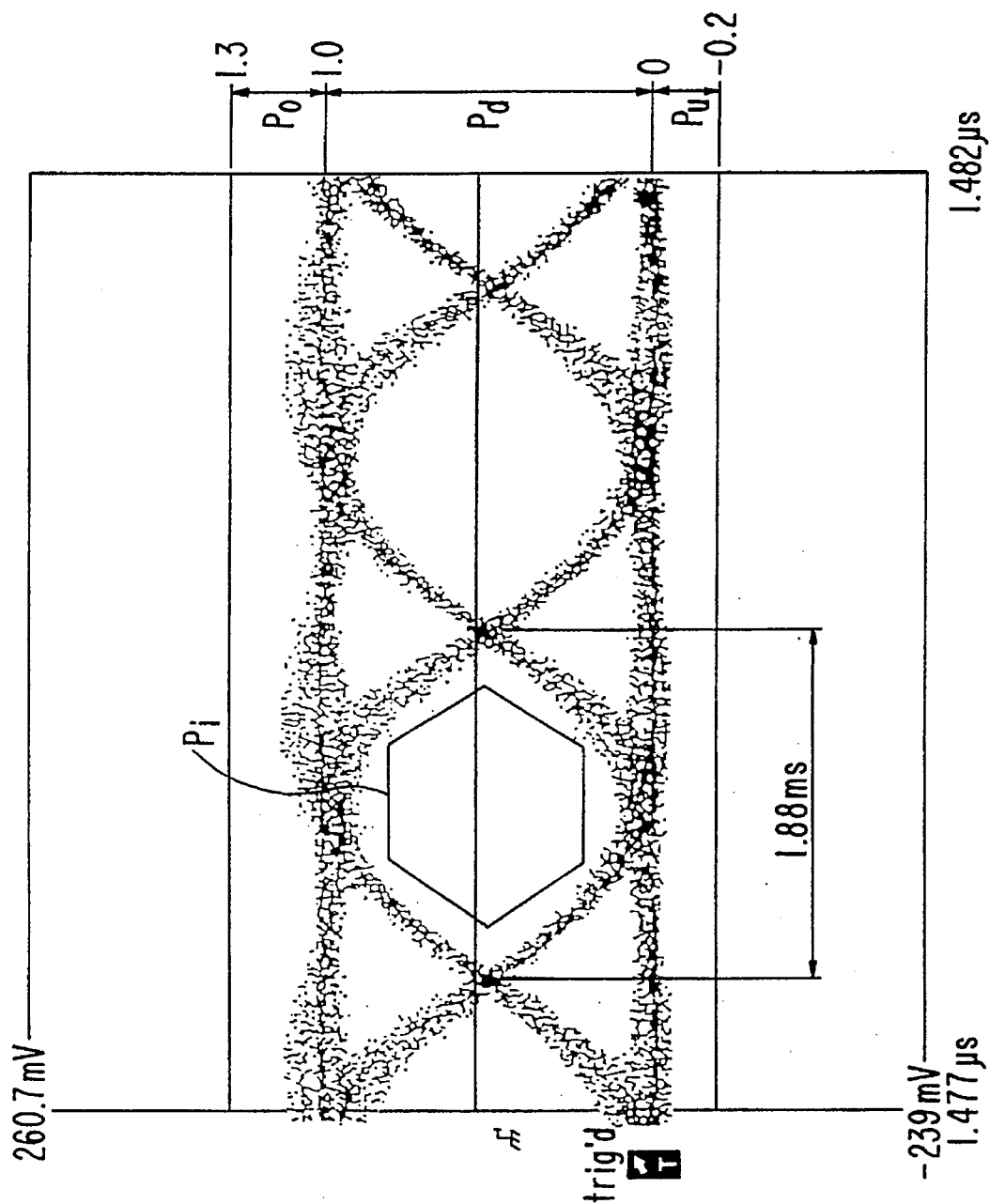
FIG. 20 is an eye pattern of a random pattern transmitted through the fiber optic module of the invention.

A high speed data transmission with LD elements emitting 780 nm wavelength with 5 mW maximum rating voltage, for example. The fiber optic module of the invention is in conformity of the ANSI x3T9.3 fiber channel standard and performs data transmission rates at 133 Mbits/s, 266 Mbits/s, 531 Mbits/s and 1061 Mbits/s. A typical performance is shown in FIG. 20. FIG. 20 shows an eye pattern of a random pattern transmitted at the transmission rate of 531 Mbits/s through the fiber optic module of the invention. FIG. 20 illustrates a voltage level converted from the optical signal emitted by LD module 50 via an opto-electric conversion element having a sufficiently broad wave band as a function of time. The figure shows optical signal passed through a Bessel filter of 400 MHz observed by an oscilloscope. In FIG. 20, reference Pd designates the standard amplitude width representing emission level, Po designates an overshoot permitted in the ANSI x3T9.3 normalized by the value of Pd, and Pu represents a permissible undershoot normalized by the value of Pd. Comparing with the permissible overshoot Po and the permissible undershoot Pu, the optical signal from the fiber optic module of the invention is surely a desirable signal having a sufficient margin from the permissible values. Reference Pi shows an eye diagram provided in the ANSI x3T9.3 being applied on the data of the invention. No errors shown in the eye diagram certify that the fiber optic module of the invention has a sufficient margin from the permissible values. In FIG. 20, a cyclic period of the optical signal of 1.88 ns is drawn for a proper understanding of performance of the invention at 531 Mbits/s.

Figure 21:
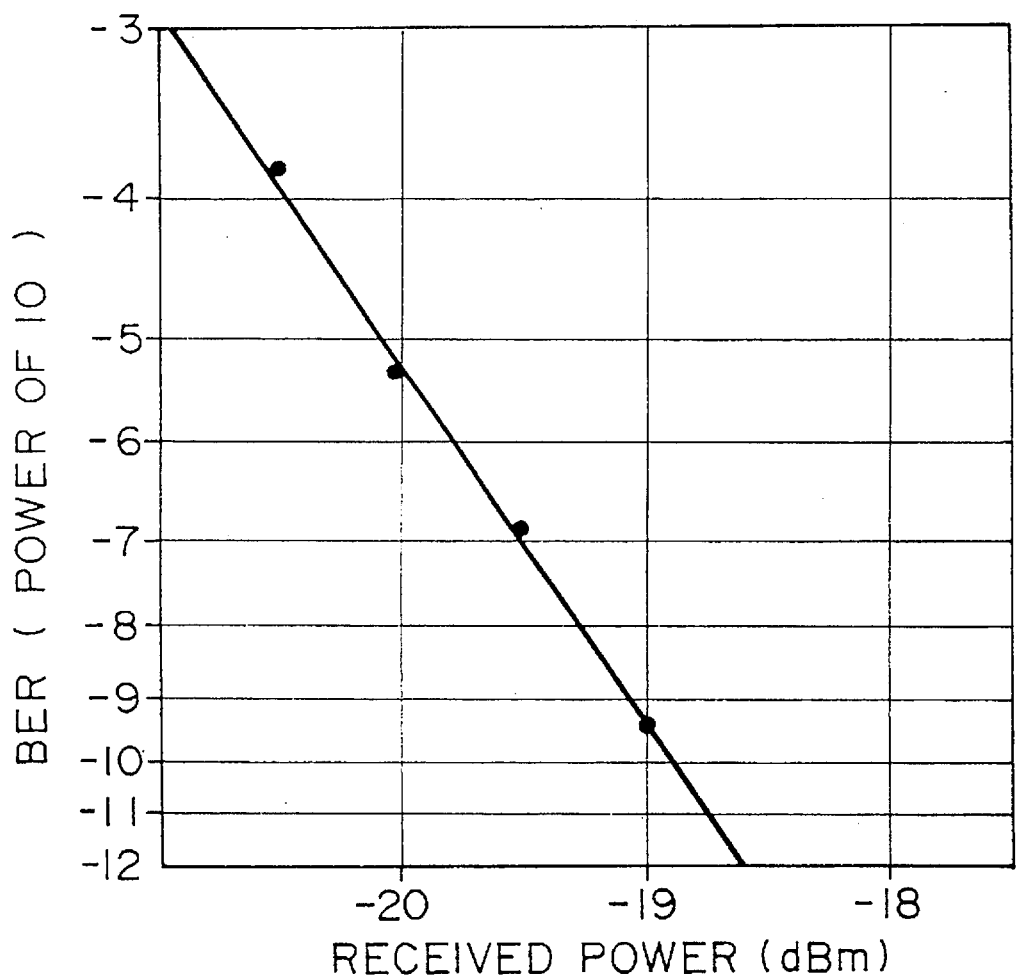
FIG. 21 shows a bit error rate (BER) of the fiber optic module of the invention.
Figure 22:
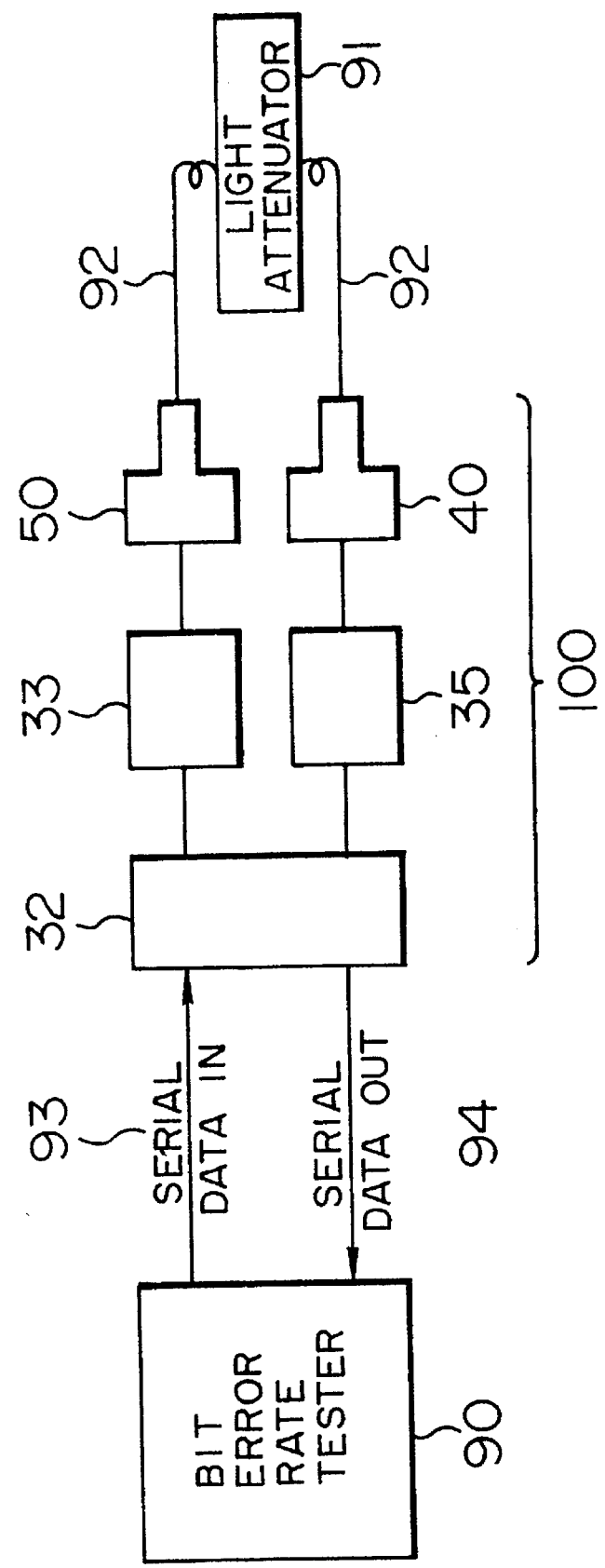
FIG. 22 is a circuit diagram of measuring circuit for the bit error rate.

FIG. 21 shows a bit error rate (BER) of the fiber optic module of the invention. FIG. 21 illustrates the bit error rate in a logarithmic scale as a function of the optical power received by the optical sensor. The bit error rate is measured by a bit error rate tester connected with the optical sensor through the fiber optic module. The measuring circuit is shown in FIG. 22 as an example. An electrical serial data 93 from the bit error rate tester 90 is transmitted to LD driver 33 via PCB connector 32. LD driver 33 converts the electrical serial data to an optical signal for stimulating LD module 50. The optical signal emitted from LD module 50 is transmitted to PD module 40 via optical cables 92 and light attenuator 91. The optical signal transmitted to PD module 40 is then converted to an electric signal by amplifier 35 and transmitted to bit error rate tester 90 in the form of serial data output 94 via PCB connector 32. The bit error rate shown in FIG. 21 means a-ratio of serial data 94 passed after fiber optic module assembly 100 compared with serial data 93 which is before passing through the assembly 100. For example, when error occurs in one bit during transmission of 1000 bits of data, the ratio becomes $10^{-3}$. The received power shown in FIG. 21 represents the intensity of the optical signal incident to PD module 40 shown in FIG. 22. The optical signal emitted by LD module 50 is variably regulated by light attenuator 91 in level of an incident optical signal to control the received power or intensity of the optical signal transmitted to PD module 40. The diagram of FIG. 21 is obtained in the manner described above utilizing the measuring circuit shown in FIG. 22.

In FIG. 21, the actual plotted points are at the received powers of −20.5 dBm, −20 dBm, −19.5 dBm and −19 dBm only. A linearly extrapolated line of the above four plotted points shows the received power at $10^{-12}$ of BER reaches −18.6 dBm, which value sufficiently clears the minimum received power of −15 dBm recommended by the ANSI x3T9.3 for satisfying the bit error rate of $10^{-12}$.

Explanation will next be made as to the compact design of the PCB 30 by referring also to FIG. 1.

General expansion slots for insertion of a mother board into a host computer.are designed, in most cases, at intervals of 25.4 mm, in which case a fiber optic module must be designed adaptive to the intervals of 25.4 mm so that the module can be mounted horizontally or vertically to the mother board. In other words, it is desirable to design the width-directional dimension of the PCB 30 to be shorter than 25.4 mm.

When the PCB connector 32 has 22 pins (arranged in 2 columns with 11 lines) with pin pitches of 1.27 mm, the connector has a width-directional dimension of about 14 mm and a longitudinal dimension of 2.5 mm, which results in that the outline of the PCB connector 32 including its housing and lead parts (not shown) has a width-directional dimension of 17 mm and a longitudinal dimension of 5 mm. The outline of the semiconductors IC (33 and 35) has a width-directional dimension of 7 mm and a longitudinal dimension of 10 mm (or may have a width-directional dimension of 10 mm and a longitudinal dimension of 7 mm). When not only the outline dimensions of the PCB connector 32 and semiconductor ICs but also the parts mounting to the PCB 30 and the wiring pattern of the PCB 30 are taken into consideration, it is desirable that the outline of the PCB 30 have a width-directional dimension of 19 mm or more and a longitudinal dimension of 30 mm or more. Even when the number of such semiconductor ICs for use in signal processing is increased up to 3, the longitudinal dimension of the PCB 30 can be designed to be 50 mm or less. Thus, it is desirable to set the width of the PCB 30 between 17 mm and 25.4 mm and the length of the PCB 30 between 30 mm and 50 mm. In the first aspect of the present invention, the PCB 30 is set to have a width of 22.5 mm, a length of 32 mm (the longest part) and a thickness of 1.6 mm (providing a mechanical strength), thus realizing a reliable PCB 30. Further, the PCB connector 32 is of a surface mounting type and only two of the semiconductor ICs are employed for signal processing, whereby a small size of PCB 30 is realized. In the first aspect of the present invention, the thickness of the PCB 30 is not specifically limited. In this connection, since the use of the surface mounting type of PCB connector 32 enables minimization of unnecessary radiation issued from the connector, this is especially useful for such a compact fiber optic module as in the present aspect.

Figure 2:
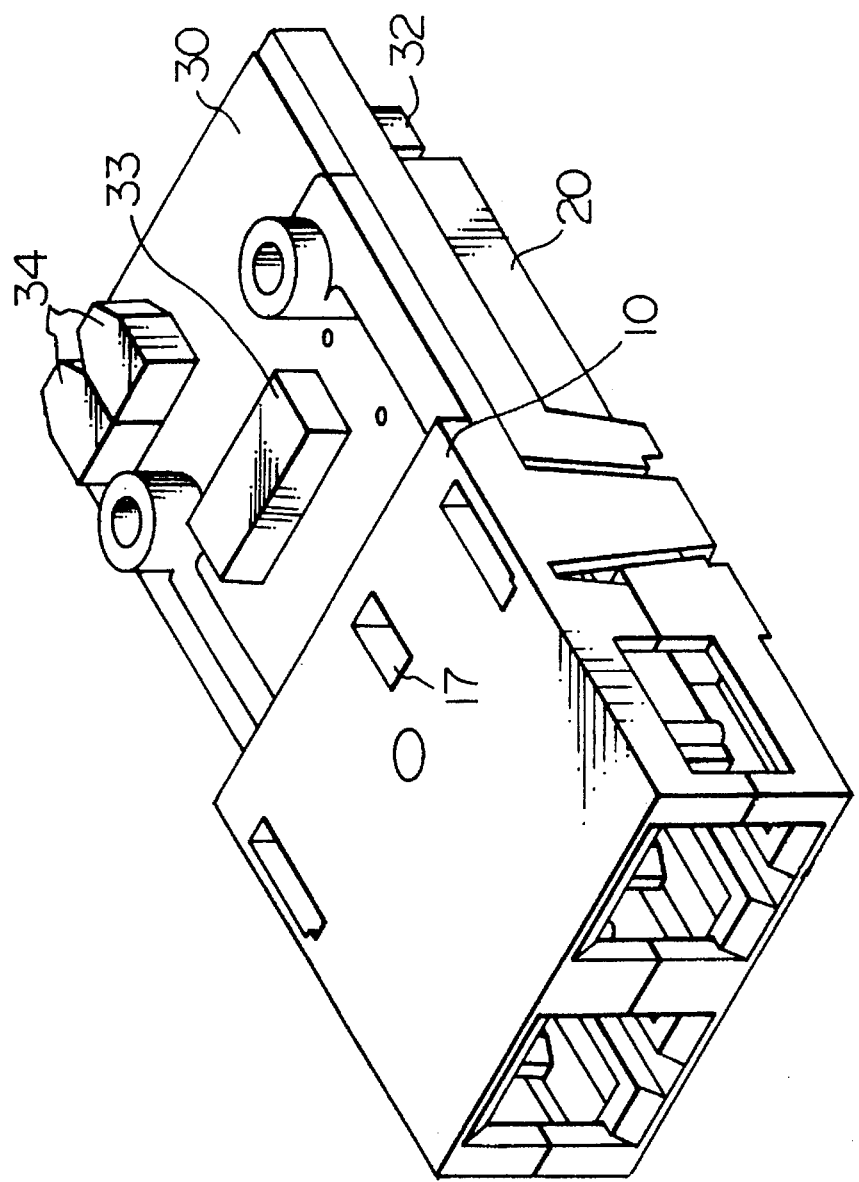
FIG. 2 is a perspective view of a fiber optic module in accordance with a second aspect of the present invention.

Shown in FIG. 2 is a perspective view of a fiber optic module in accordance with a second aspect of the present invention. Explanation will be made as to the compact design of the fiber optic module by referring to FIG. 2.

The PCB 30 is held by an upper frame 10 and a lower frame 20 to form an assembly or fiber optic module. The PCB 30 is mounted thereon with an LD driver 33 formed as a semiconductor IC for driving an LD element (refer to FIG. 8), variable resistors 34 for adjusting a current for driving of the LD element (not shown), and a PCB connector 32 for connection with a mother board (not shown). In order to keep constant the average wall thickness of the upper frame 10, a thin wall part 17 is provided in the upper frame 10.

As already explained even in connection with the compact design of the PCB 30 of FIG. 1 in the first aspect, expansion slots for insertion of a mother board into a host computer are arranged, in many cases, at intervals of 25.4 mm, so that it is necessary to design a fiber optic module to be mountable to the mother board horizontally or vertically to the 25.4 mm-interval expansion slots. Thus, it is desirable that the module have a width-directional dimension of 25.4 mm at maximum. In the illustrated example, the PCB 30 is designed to have a width-directional dimension of 17 mm–25.4 mm and a longitudinal dimension of 30 mm–50 mm. In view of the width-directional dimension, in order to avoid any offset in the direction perpendicular to the width direction of the PCB 30, it is desirable that the frame of the fiber optic module be larger than the width of the PCB 30. For example, when the width of the frame is 2 mm or more larger than the width of the PCB 30, a step for offset prevention of the PCB 30 can be provided in the frame. Accordingly, when consideration is given to the width-directional dimension of the PCB 30, the width-directional dimension of the fiber optic module is designed desirably to be about between 19 mm and 25.4 mm.

Next, with regard to the longitudinal direction, in view of the fact that the PCB 30 has a longitudinal dimension of 30 mm–50 mm and the LD module 50 has a length of about 15 mm, the fiber optic module has a length of 45 mm–65 mm. That is, the longitudinal dimension of the fiber optic module is set to be desirably about between 45 mm and 65 mm.

As already explained in connection with the height direction, in view of the fact that the fiber optic module of the present invention is to be vertically or horizontally positioned to be built in between the expansion slots of the host computer, the height of the module is set to be desirably 25.4 mm or less. When additional consideration is given to such a situation that two of the fiber optic modules of the present invention are mounted as doubly overlapped to the mother board, the module height is set to be more desirably 12.7 mm or less. Further, when consideration is given to the wrong insertion preventing mechanism of an optical fiber plug (not shown) to be fitted into the fiber optic module, the receptacle of the optical fiber plug, the strength of the frame, etc., it is more preferable that the fiber optic module have a height of 9 mm or more. Accordingly, it is preferable for the fiber optic module to have a height-directional dimension of about 9 mm–25.4 mm.

Under such conditions as mentioned above, the aspect of the present invention shown in FIG. 2 realizes a very small-sized module of 25.4 mm wide, 50.8 mm long and 11.5 mm high. When functions necessary as the fiber optic module are sufficiently built into the compact outline dimensions, it goes without saying that the flexibility of mother board design by system manufacturers can be remarkably expanded.

Figure 3:
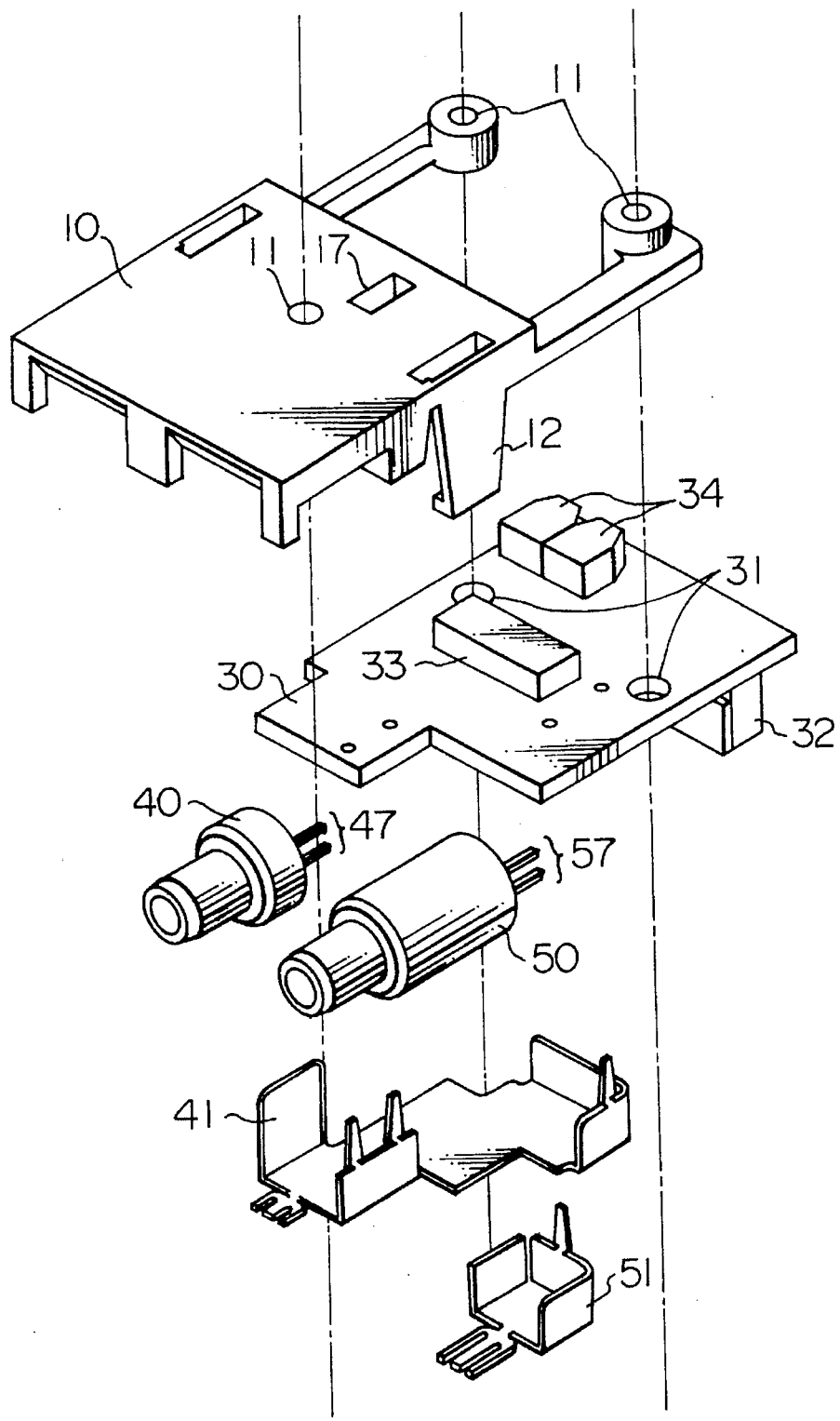
FIG. 3 is an exploded perspective view of a part of a fiber optic module in accordance with a third aspect of the present invention.
Figure 4:
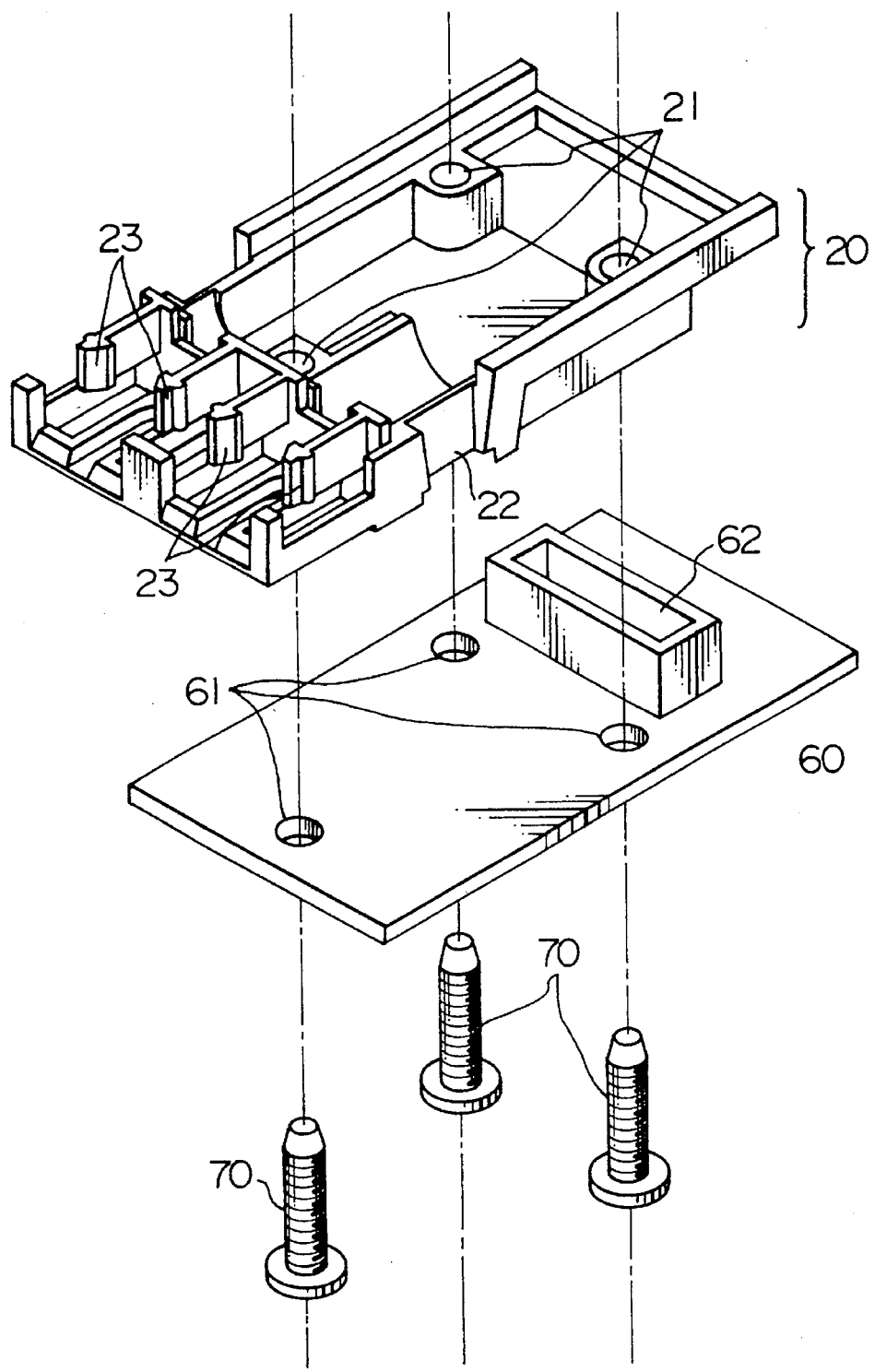
FIG. 4 is an exploded perspective view of another part of a fiber optic module in accordance with the third aspect of the present invention.

FIGS. 3 and 4 collectively show exploded perspective views of a fiber optic module in accordance with a third aspect of the present invention. In FIGS. 3 and 4, a laser diode module (which will be referred to as the LD module, hereinafter) 50 for emitting an optical signal and a photodiode module (which will be referred to as the PD module, hereinafter) 40 for receiving an optical signal are mounted onto a printed circuit board (which will be referred to as the PCB, hereinafter) 30, to which a PD shielding plate 41 and an LD shielding plate 51 are attached for the purpose of avoiding electromagnetic or electrostatic noise. Also attached to the PCB 30 are a PCB connector 32 for establishing electric connection with a mother board 60, an LD driver 33 formed as a semiconductor IC for driving the LD module 50, and variable resistors 34 for adjusting a current for driving of the LD module 50 or for adjusting the detection level of a signal received at the PD module 40. For the purpose of effectively making use of the mounting surface of the PCB 30, a surface mounting type of PCB connector 32 is employed and the variable resistors 34 are mounted onto the rear side of the PCB connector 32. Since the surface mounting type of the PCB connector 32 is used in the fiber optic module of the present invention, the need for the step for manually soldering a connector, which has been necessary in the prior art, can be eliminated with the result of realization of low-cost fiber optic module based on automatic mounting. Further, the rear side of the PCB connector 32 may be mounted with not only the variable resistors 34 but also chip resistors or capacitors or such circuit parts as semiconductor ICs, thus realizing a compact PCB 30.

In addition, since the variable resistors 34 are disposed on the upper side of the PCB 30, the adjustment step during assembly of the fiber optic module can be facilitated. In other words, since the PCB connector 32 of the PCB 30 is mounted to a jig substrate of the PCB 30 for assembly/adjustment of the fiber optic module, so that, when compared with such a case that the variable resistors 34 are disposed on the same side as the PCB connector 32, the case of mounting the variable resistors 34 on the upper side of the PCB 30 can be made high in the efficiency of adjusting works of the fiber optic module by a worker. Thus, the more efficient adjusting works lead to realization of a low-cost fiber optic module.

Each of PD and LD leads 47 and 57 has a relatively large land (not shown) on its PCB connector 32 side to improve its assembling efficiency to the PCB 30. Meanwhile, the mother board 60 also has a mother connector 62 to be associated with the PCB 30.

The PCB 30 mounted with the PD module 40, LD module 50 and so on is temporarily fixed by means of a snap-fit mechanism based on a projection 12 of the upper frame 10 and a recess 22 of the lower frame 20, so that a resultant assembly including these upper and lower frames 10 and 20 and the PCB 30 forms a fiber optic module. The PD and LD modules 40 and 50 mounted on the PCB 30 are fixed to the upper and lower frames 10 and 20 through PD and LD shielding plates 41 and 51 made of plate springs. Further, the PD and LD shielding plates 41 and 51 are fixedly mounted to the PCB 30 by soldering or by other means and surrounded by the lower frame 20, so that the PD and LD shielding plates 41 and 51 can be secured with very high mechanical stability. Since the shielding plates 41 and 51 are electrically isolated from the mother board 60 by the lower frame 20, any short-circuiting and leakage of the plates with respect to parts mounted on the mother board 60 can be avoided, thus realizing a reliable fiber optic module.

The lower frame 20 is provided with pawls 23 for coupling the optical signal with other fiber optic modules, so that the pawls 23 can snugly engage with optical fiber plugs (not shown).

After the temporarily fixed fiber optic module is positioned at its rough position on the mother board 60 by fitting the PCB connector 32 into the mother connector 62, the fiber optic module is completely fixedly mounted onto the mother board 60 by means of tapping screws 70. More specifically, the tapping screws 70 are passed through mother openings 61 provided in the mother board 60, lower frame openings 21 and PCB connector 32, and then tightly tightened into upper frame openings 11, whereby the fiber optic module is completely fixed onto the mother board 60.

In general, reduction in the positioning accuracy between the mother connector 62 and PCB connector 32 lead to the fact that a load is imposed on the respective leads (PD leads 47 and LD leads 57) of the PD module 40 and LD module 50. In other words, although the respective leads of the PD module 40 and LD module 50 are fixed onto the PCB 30 by soldering or the like, since the PCB connector 32 is also fixed onto the PCB 30 by soldering or the like. For this reason, if the positioning accuracy of the mother connector 62 with respect to the mother openings 61 and the positioning accuracy of the PCB connector 32 with respect to PCB openings 31 are not improved, then these positioning errors result in loads imposed on the respective leads of the LD module 50 and on lands (not shown) of the PCB 30. More in detail, when the mother connector 62 is mounted inaccurately apart from the mother openings 61 at the time of building the fiber optic module into the mother board 60, tensile stresses are imposed on the PD and LD leads 47 and 57 and the lands of the PCB 30; whereas, when the mother connector 62 is conversely mounted inaccurately close to the mother openings 61, compression stresses are imposed on the PD and LD leads 47 and 57 and the lands of the PCB 30. These stresses result in the fact that the reliability of the fiber optic module is remarkably reduced. For the purpose of avoiding these tensile and compression stresses, it is necessary to improve the positioning accuracy of the connector part, which undesirably involves an increase in the cost of the fiber optic module. It goes without saying that the similar detrimental effect takes place even for the PCB connector 32.

However, in accordance with a third aspect of the present invention, in which the mother openings 61, lower frame openings 21 and PCB openings 31 are set to have a diameter of 3.2 mm and the upper frame openings 11 are set to have a diameter of 2.2 mm and further the fixation of the fiber optic module is effected by means of the employment of the tapping screws 70 (having a diameter of about 2.6 mm), requirement of the positioning accuracy of the mother connector 62 with respect to the mother openings 61 and the positioning accuracy of the PCB connector 32 with respect to the PCB openings 31 can be reduced so that loads caused by the tensile and compression stresses imposed on the leads (47 and 57) of the PD and LD modules 40 and 50 and on the lands of the PCB 30, which has been a big problem in the prior art, are eliminated, thus realizing a reliable fiber optic module. Further, since the requirement of parts positioning accuracy can be radically reduced compared to the prior art, not only the production management of assembly of the PCB connector 32 for the PCB 30 can be facilitated but the required accuracy of parts used in the PCB 30 and PCB connector 32 can also be reduced, whereby a very inexpensive fiber optic module can be realized.

The aforementioned numeric values for the upper frame openings 11, lower frame openings 21, etc. are given as an example and thus the present invention is not limited to the specific values. With the arrangement of the third aspect of the present invention, it will be noted that values other than the above numeric values may be employed with substantially the same effects as the above.

In this way, when the fiber optic module is made compact and small in size and is provided with indispensable minimum functions, the system manufacturer can also design the mother board highly flexible. That is, since the fiber optic module of the present invention is made compact with its small occupation area to the mother board and the fixation of the fiber optic module requires only 3 small holes, the mother board can be designed highly flexible.

In addition to the above, the arrangement of the 3 openings (upper and lower frame openings 11 and 21 and mother openings 61) forms such an isosceles triangle that stress loads caused by mounting and dismounting of the fiber optic module are ideally dispersed, with the result of implementation of a fiber optic module having a high reliability.

Figure 5:
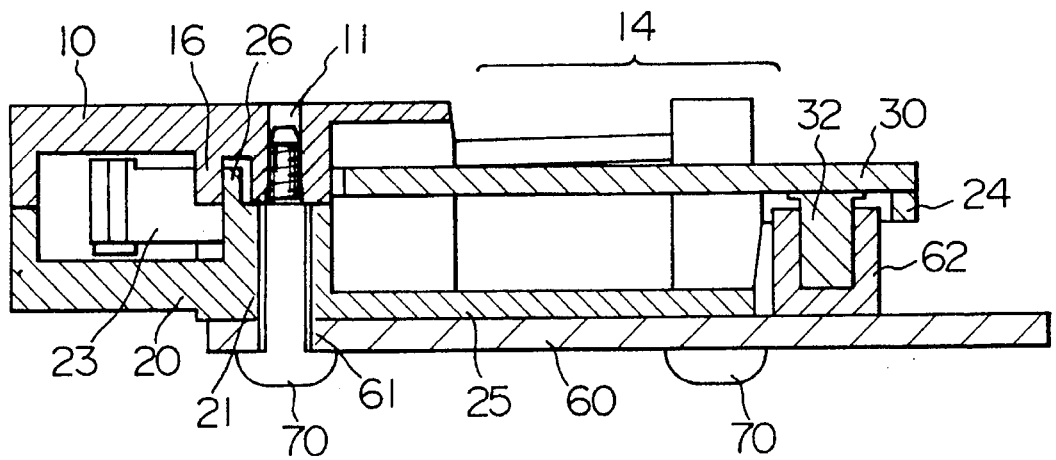
FIG. 5 is a cross-sectional view of a major part of a fiber optic module in accordance with a fourth aspect of the present invention.

Shown in FIG. 5 is a cross-sectional view of a major part of a fiber optic module in accordance with a fourth aspect of the present invention. In the drawing, the fiber optic module comprising a PCB 30 and upper and lower frames 10 and 20 is secured together with a mother board 60 by means of tapping screws 70 which pass through mother openings 61 and lower frame openings 21 into upper frame openings 11 and then fixed thereto. Electrical connection between the fiber optic module and mother board 60 is established by means of a PCB connector 32 and a mother connector 62.

The upper and lower frame openings 11 and 21 may also be used as reference holes for parts acceptance test of the upper and lower frames 10 and 20 respectively. Since the 3 upper frame openings 11 and the 3 lower frame openings 21 are set to have a drawing taper of 0 degree at their molding time, the accuracy of the respective openings (upper and lower frame openings 11 and 21) can be maintained high. Since the accuracy of the openings can be kept high, when jigs designed for the parts acceptance test associated with the openings are prepared, the parts inspection can be facilitated. In other words, the upper and lower frame openings 11 and 21 can be used not only as holes for fixation of the fiber optic module to the mother board 60 but also as parts inspection holes.

Further, the fiber optic module of the present invention is arranged so that loads imposed on the fiber optic module caused by the mounting and dismounting of the optical fiber plug are supported by the 3 tapping screws 70. More specifically, the specification of the Japanese Industrial Standards JIS of the fiber optic module prescribes 90N (newtons) with respect to the force derived by mounting and dismounting of the optical fiber plug, so that, for the purpose of satisfying this specification, it is desirable that the tapping screws 70 have a diameter of 1.3 mm or more. Further, from the viewpoint of safety design, the tapping screws 70 are set to have a diameter of more desirably 2 mm or more. In the fiber optic module of the present invention, since the tapping screws 70 are set to have a diameter of 2.6 mm, there is realized a reliable fiber optic module having a safety factor of 3 or more.

Although the fixation of the mother board 60 has been attained with use of the tapping screws 70 in the fourth aspect of the present invention, insert nuts (not shown) may be mounted in the upper frame openings 11 and the tapping screws 70 may be replaced by ordinary small screws (such as small crosshead screws and small slotted screws) or the like with substantially the same effects as the present invention.

When the fiber optic module has such an arrangement as shown in the fourth aspect of FIG. 5 in this way, it is clear that there can be avoided not only breakage of the resin frame legs but also the improper electrical connection of the leads, which has been problems in the prior art.

Figure 23:
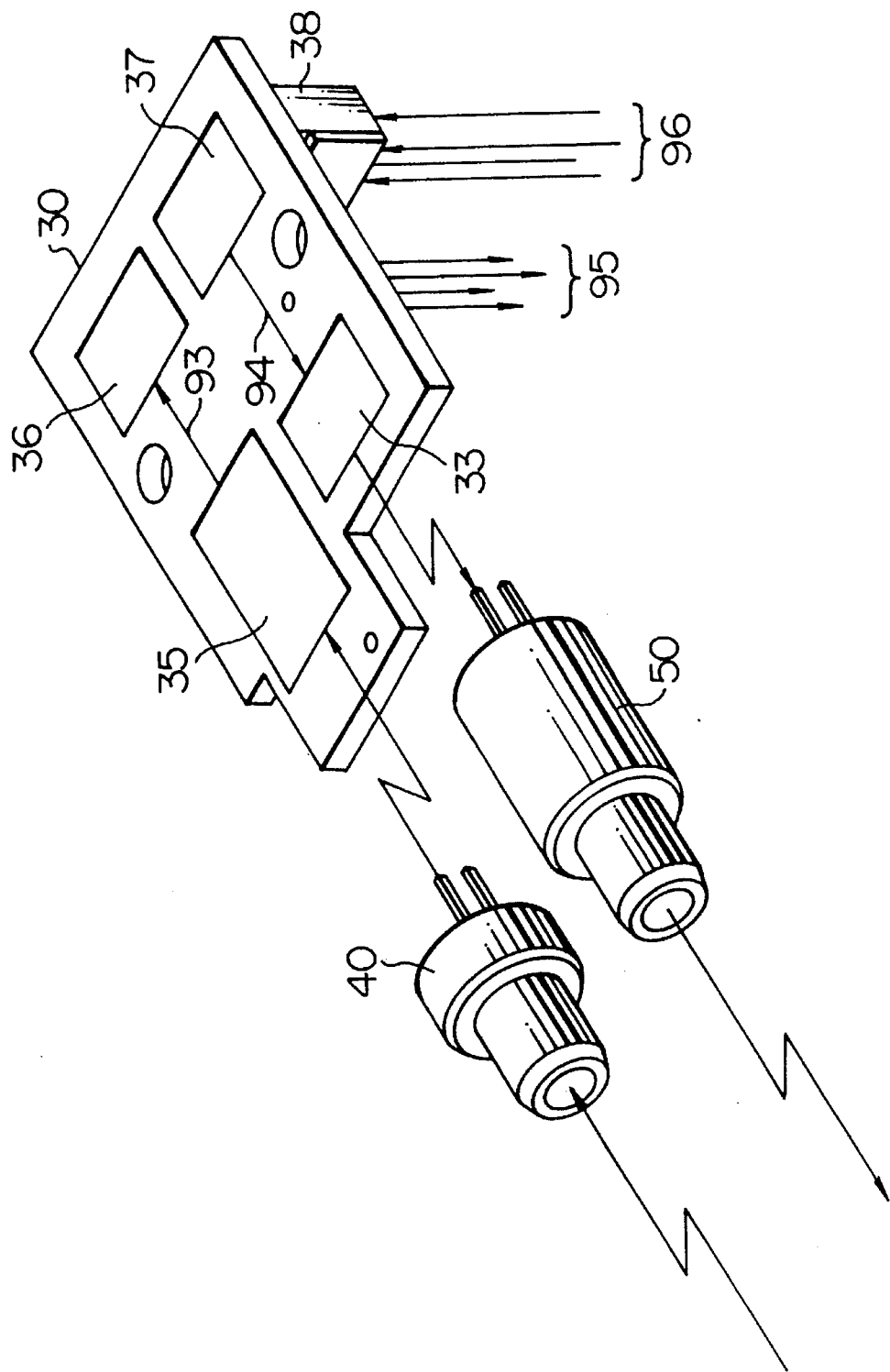
FIG. 23 is a block diagram of the fiber optic module of the fourteenth aspect of the invention.

FIG. 23 is a block diagram of the fiber optic module of the fourteenth aspect of the invention. The differences of the fiber optic module in FIG. 23 compared with that of FIG. 1 are to be added with serial to parallel converter 36 made of a semiconductor integrated circuit IC for converting serial data 93 to parallel data 95 and parallel to serial converter 37 made of a semiconductor IC for converting parallel data 96 to serial data 94 and to be replaced PCB connector 32 with PCB connector 38.

Describing in more detail, parallel data 96 transmitted from the mother board are transferred to parallel to serial converter 37 via PCB connector 38 on PCB 30 to be converted to serial data. On the contrary, serial data 93 converted from the optical data are converted to parallel data 95 by serial to parallel converter 36 and then transferred to the mother board. PCB connector 38 of the aspect is different from PCB connector 32 previously described and shown in FIG. 1, because the data transmitted with the mother board through are parallel type which is different from the data shown in FIG. 1. In concrete, the number of connecting pins of PCB connector 38 is larger than that of PCB connector 32 in FIG. 1.

Figure 6:
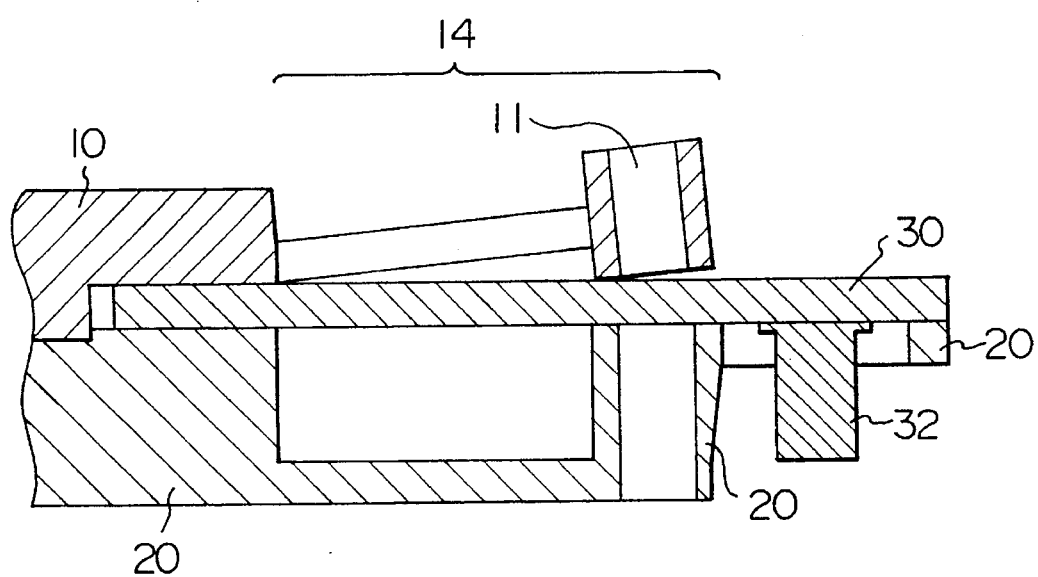
FIG. 6 is a cross-sectional view of a major part of a fiber optic module in accordance with a fifth aspect of the present invention.

FIG. 6 shows a cross-sectional view of a major part of a fiber optic module in accordance with a fifth aspect of the present invention. The present aspect is arranged so that a PCB 30 is temporarily fixed by upper and lower frames 10 and 20 by means of a snap-fit mechanism as already explained in connection with the third aspect of FIG. 3, but is different from the aspect of FIG. 3 in that the rear part of the PCB 30 is also lightly depressed under the influence of elastic deformation of an arm 14 of the upper frame 10 in FIG. 6. In more detail, a step difference (exaggeratedly shown in the drawing for clear illustration) of about 0.2 mm is provided in upper frame openings 11 in the vicinity of a contact surface between the upper frame openings 11 on the arm 14 and the PCB 30. When such an arrangement is employed, handling of the fiber optic module in its temporarily fixed state becomes more easily. In other words, since not only the front part of the PCB 30 is held by the snap-fit mechanism but the rear part of the PCB 30 is also held by the arm 14 of the lower frame 20, a stabler fiber optic module assembly can be realized, so that not only mounting of the fiber optic module to the mother board 60 but also the handling of the fiber optic module per se can be facilitated.

The prior art PCB is arranged so that the rearmost and frontmost ends of the PCB are depressed by frames, thus causing a warpage problem. On the other hand, since the PCB 30 in accordance with the fifth aspect of the present invention is arranged so that the PCB 30 is held at its foremost part and a part slightly displaced rearward from its center part, such a warpage problem as in the prior art can be solved. Further, though the prior art arrangement requires special strokes (length) for the PCB and the upper and lower frames, the arrangement of the present aspect can eliminate the need for such strokes and thus the fiber optic module of the invention can easily be made small in size.

Figure 7:
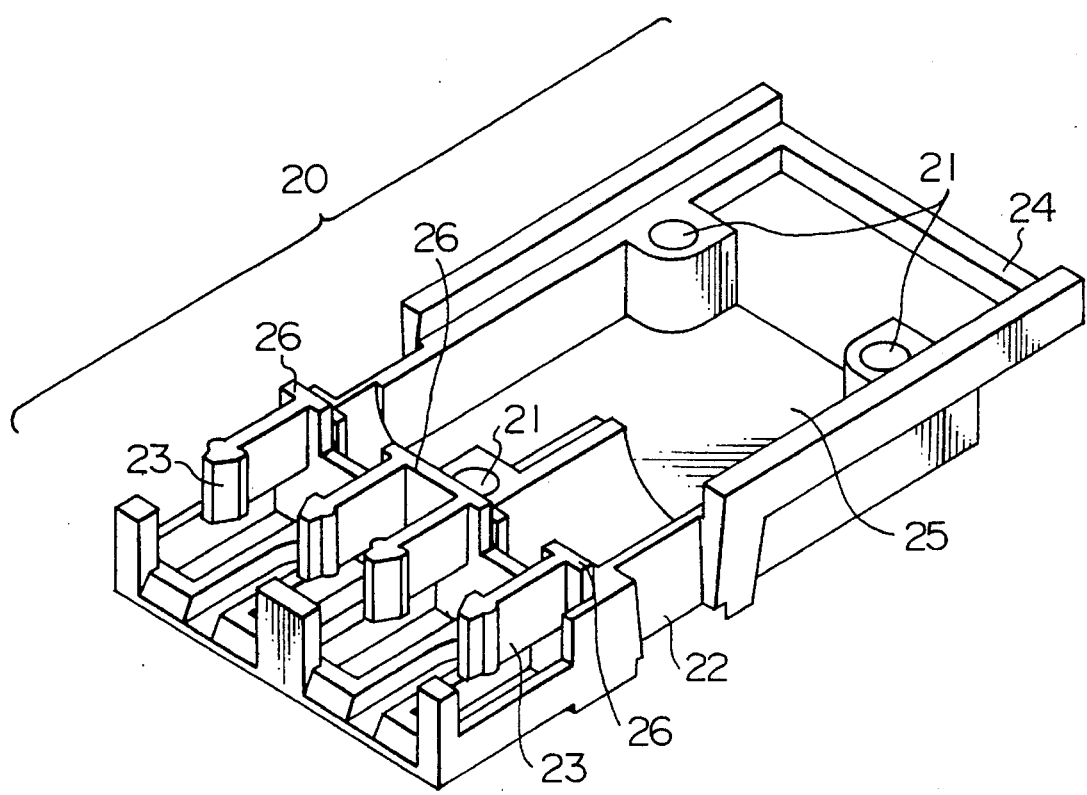
FIG. 7 is a perspective view of a lower frame for a fiber optic module in accordance with a sixth aspect of the present invention.

There is shown in FIG. 7 a perspective view of a modification of the lower frame 20 usable in a fiber optic module in accordance with a sixth aspect of the present invention.

In the sixth aspect of the present invention, the upper and lower frames 10 and 20 are made of polybutylene terephthalate (PBT) mixed with 10–30% of glass, with the result that the frames are excellent in durability. In particular, the material of the frames improves the durability of pawls 23 of a lower frame 20 for mounting and dismounting of an optical fiber plug. Further, in order to reduce forces imposed on the pawls 23 of the lower frame 20, upper frame projection 16 (not shown: refer to FIG. 5) are provided in an upper frame 10 (not shown: refer to FIG. 5) to abut against associated lower frame projections 26 disposed at roots of the pawls 23. The lower frame 20 subjected to a large load caused by the mounting and dismounting of an optical fiber plug is provided with a bottom plate 25 and a rib 24 in order to increase the overall rigidity of the lower frame 20.

Although the frames have been made of PBT material in the sixth aspect of the present invention, the present invention is not limited to the above specific example but other suitable materials may be employed as necessary.

Figure 8:
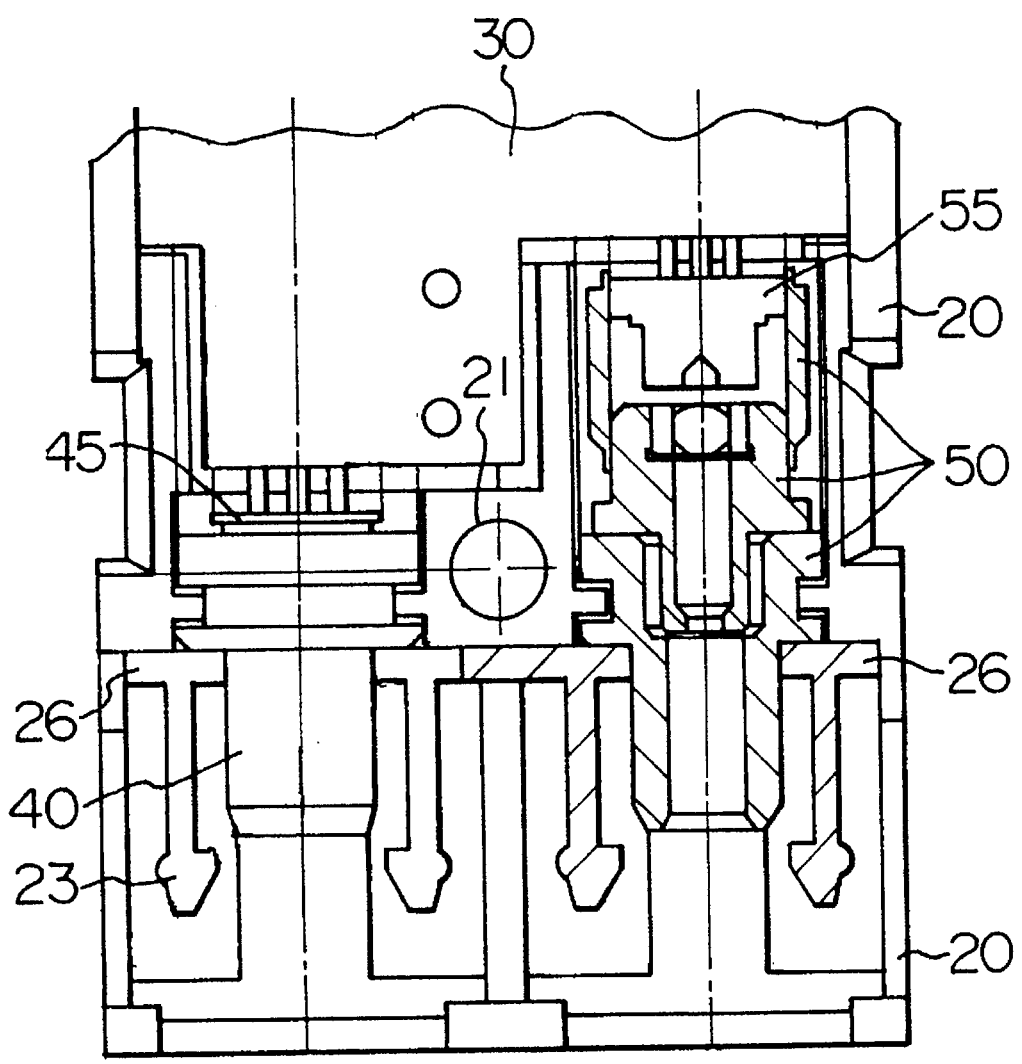
FIG. 8 is a cross-sectional view of a major part of a fiber optic module in accordance with a seventh aspect of the present invention.

Referring to FIG. 8, there is shown a plan view of a major part of a fiber optic module in accordance with a seventh aspect of the present invention, in which, for more detailed explanation, a lower frame 20, a PCB 30 and LD module 50 and PD module 40 are illustrated in plan view and partly in section. In case of a general fiber optic module, it is predominant practice that a spacing between the PD module 40 and LD module 50 is set to be 12.7 mm and the diameter of the PD element 45 and LD element 55 is to be 5 mm or so. For the purpose of protecting these PD and LD elements 45 and 55 and mechanically coupling these elements with the associated optical fibers, it is necessary for the PD and LD modules 40 and 50 to have a diameter of about 6 mm–8 mm. Accordingly, a design limit for the diameter of a lower frame opening 21 becomes about 4.7 mm–6.7 mm. In this case, when the average wall thickness of the lower frame 20 is 1.5 mm, the diameter of the lower frame opening 21 becomes about 1.7 mm–3.7 mm.

The optical fiber plug is mechanically mounted and dismounted to and from the fiber optic module by utilizing pawls 23 of the lower frame 20. The fiber optic module of the present invention has upper frame openings 21 in the vicinity of the pawls 23 subjected to the highest load during the above mounting and dismounting operation. In this case, the diameter of the upper frame openings 21 is set to be about 3 mm in order to ensure 1.5 mm of the average wall thickness of the lower frame 20. Since the fiber optic module of the present invention is highly downsized over the prior art fiber optic module, the provision of the openings for fixation of the fiber optic module disposed at the center part of the lower frame 20 and in the vicinity of the pawls 23 creates great effect of realizing a reliable fiber optic module. In the seventh aspect of the present invention, the lower frame openings 21 having a diameter of 3 mm are provided in the lower frame at positions about 2.5 mm apart from associated lower frame projections 26 subjected to the highest stress applied to the pawls 23, so that the rigid lower frame 20 having an average wall thickness of 1.5 mm is realized and therefore a highly reliable fiber optic module is implemented.

Figure 9:
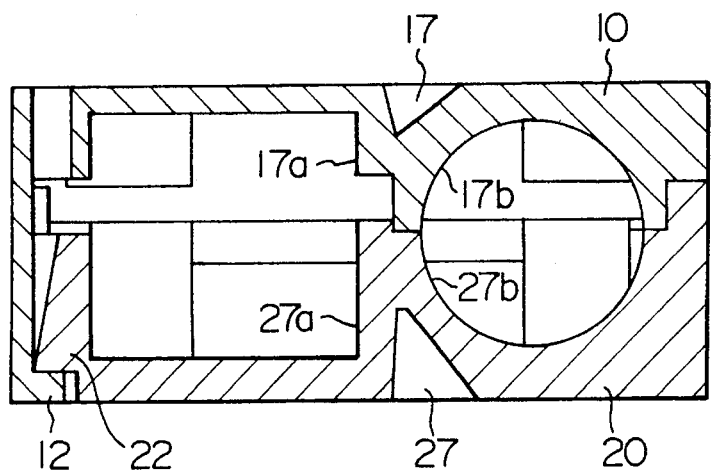
FIG. 9 is a cross-sectional view of a fiber optic module in accordance with an eighth aspect of the present invention.

Shown in FIG. 9 is a cross-sectional view of a major part of a fiber optic module in accordance with an eighth aspect of the present invention, that is, an assembled state of only the upper frame 10 and the lower frame 20 for easy explanation. The upper frame 10 is provided with a thin wall part 17 to prevent surface scars generated by the non-uniform wall thickness of the upper frame 10. More in detail, the thin wall part 17 prevents reduction in the accuracy of upper shielding fit 17a for engagement with a PD shielding plate 41 and in the accuracy of an upper module fit 17b for engagement with an LD module both caused by such surface scars. With regard to the lower frame 20, similarly, a thin wall part 27 is provided in the lower frame to prevent deformation of a lower shielding fit 27a and a lower module fit 27b both caused by surface scars similar to the mentioned above. In the eighth aspect of the present invention, provision of these thin wall parts enables achievement of the upper and lower frames 10 and 20 both having an average wall thickness of 1.5 mm and thus realization of the highly reliable upper and lower frames.

Figure 10:
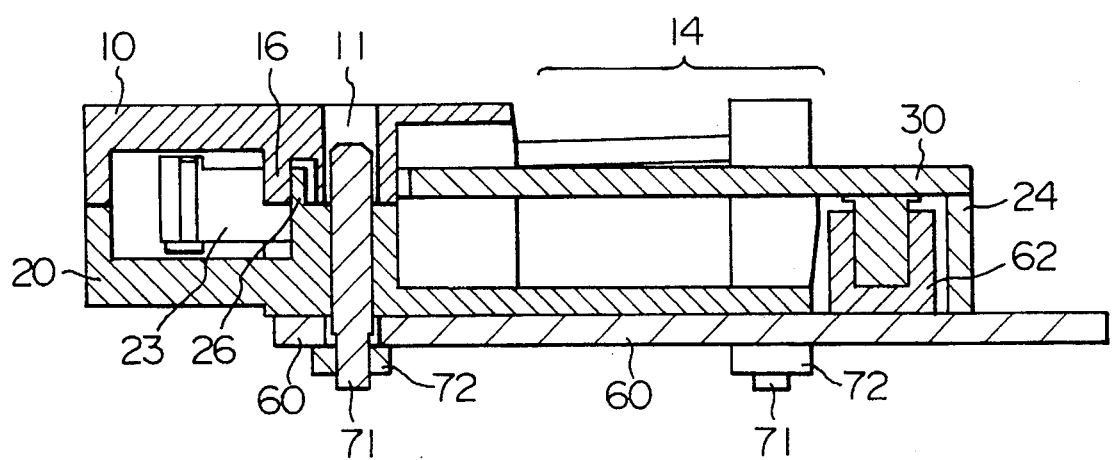
FIG. 10 is a cross-sectional view of a fiber optic module in accordance with a ninth aspect of the present invention.

FIG. 10 is a cross-sectional view of a fiber optic module in accordance with a ninth aspect of the present invention. The present aspect is different from the foregoing fourth aspect of FIG. 5 in that the tapping screws 70 are not used and pins 71 are instead integrally fixed to the lower frame 20 by integral molding (or press fitting) and the fiber optic module is fixedly mounted onto a mother board 60 by means of nuts 72 engaging with the pins 71. For allowing the upper frame 10 and PCB 30 to be located at rough positions, the upper parts of the pin 71 are projected upwardly beyond the contact surface between the upper and lower frames 10 and 20. Further, the pins 71 are also extended downwardly through the mother board 60 to allow rough positioning of the fiber optic module as guiding pins for automatic assembling. Furthermore, in order to increase the rigidity of the fiber optic module, a rib 24 is extended toward the mother board 60.

In this way, even the arrangement of the fiber optic module shown in FIG. 10 can not only remove the loads imposed on the respective leads of the PD and LD modules 40 and 50 and on the lands of the PCB 30 as already explained earlier in connection with FIG. 5 but also reduce the mounting positional accuracy requirement of parts such as connectors and the dimensional accuracy requirement of the parts per se, whereby there can be realized a fiber optic module with a high reliability and low cost. Further, the pins 71 integrally formed with the lower frame 20 may be used also as reference positions for part acceptance test of the lower frame 20. Furthermore, the LD shielding plate 51 and the PD shielding plate 41 shown earlier in FIG. 3 may be integrally formed with the lower frame 20 together with the pins 71 to realize a fiber optic module with a further reduced cost.

Of course, the fourth aspect of FIG. 5 may be combined with the ninth aspect of FIG. 10 with substantially the same effects of the present invention.

Although the 3 pins 71 (or tapping screws 70) have been used in the ninth aspect of the invention (or in fourth aspect), only one pin 71 (or tapping screw 70) may be employed for the opening in the vicinity of the pawls 23 imposed with the highest stress load due to the mounting or dismounting of the optical fiber plug and resin projections extended from the lower frame may be utilized for the other openings in the vicinity of the arm 14, with substantially the same effects of the invention.

Figure 11:
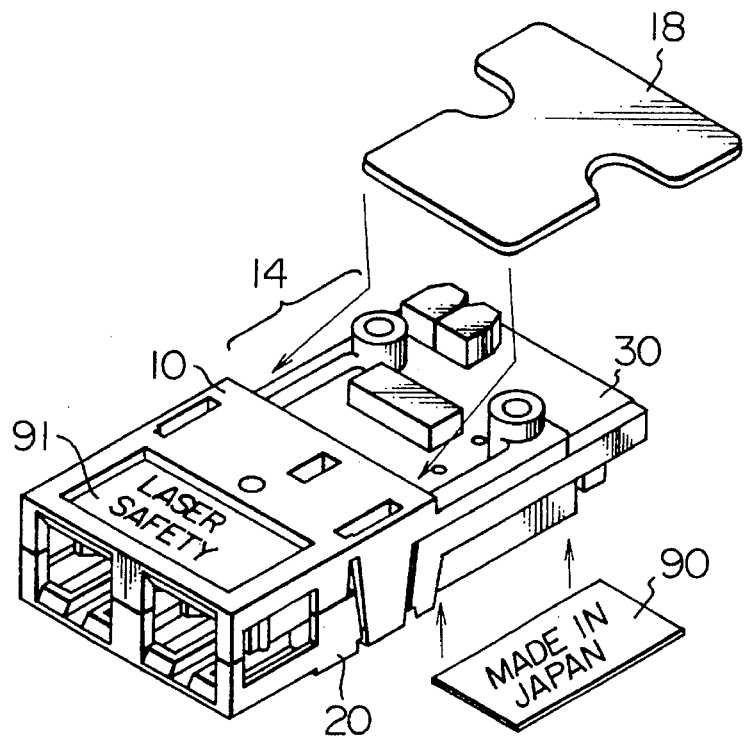
FIG. 11 is a perspective view of a fiber optic module in accordance with a tenth aspect of the present invention.

FIG. 11 is a perspective view of a fiber optic module (or a combination of upper and lower frames 10 and 20 and a PCB 30) in accordance with a tenth aspect of the present invention, which module is mounted with a cover 18 for prevention of electrostatic destruction. After the fiber optic module is assembled and adjusted, the cover 18 is mounted on the fiber optic module. Since most of the mounted parts of the PCB 30 are covered with the upper and lower frames 10 and 20 and the cover 18, the possible electrostatic destruction of the fiber optic module during handling thereof, which has been a problem in the prior art, can be substantially avoided.

The material of the cover 18 is not specifically restricted by the presence or absence of electrical conductive property of the material. In other words, the material of the cover is not limited from the viewpoint of resistance of the PCB 30 to the electrostatic destruction and metallic and resin material can be employed. More specifically, though the cover 18 has been made of the same PBT as the upper frame in the present aspect, the electrostatic destruction of the PCB 30 possibly caused during handling of the fiber optic module, which has been a problem in the prior art, can be eliminated.

Further, even when the cover 18 is made of iron alloy from the viewpoint of the electrostatic destruction resistance of the PCB 30 and the electromagnetic shielding of the PD module 40, substantially the same effects can be achieved. It will be noted that, even when the cover 18 is made of not only iron alloy but also iron, aluminum, aluminum alloy, copper, copper alloy or the like, substantially the same effects can be obtained. It will also be appreciated that a method for fixing the cover 18 to the fiber optic module may be the fitting method based on the arm 14, the snap-fit method or bonding but the invention is not restricted to the specific example.

In the fiber optic module of the present invention, next, the upper surface of the upper frame 10 is made flat and the bottom plate of the lower frame 20 is made also flat in order to increase the rigidity of the lower frame 20, so that an identification label 90 indicative of the place of production of the fiber optic module and a certification label 91 indicative of satisfied specifications of laser safety standard can be easily pasted or bonded on the flat surface of the upper or lower frame.

Further the flat part (not shown) of the upper frame 10 and the flat part or a recess (not shown) of the lower frame 20 are provided respectively with a step difference part or a recess (not shown) of about 0.3 mm to allow easy bonding work of the identification label 90 or certification label 91.

It goes without saying that, for the purpose of decreasing the cost of the fiber optic module of the invention, not only these label indications may be adhesive bonded as labels but may also be marked in the respective frames.

Figure 12:
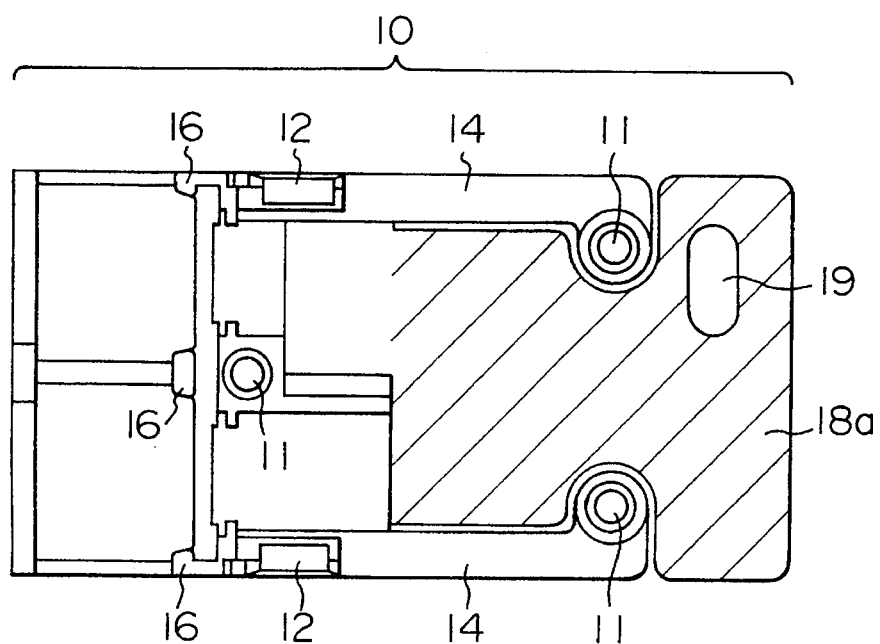
FIG. 12 is a plan view of a fiber optic module in accordance with an eleventh aspect of the present invention.

FIG. 12 is a plan view of a fiber optic module in accordance with an eleventh aspect of the present invention. The present aspect is different from the tenth aspect of FIG. 11 in that a cover part 18*a* is integrally formed with the upper frame 10. Another difference of the aspects of FIGS. 11 and 12 from other aspects is that a cover opening 19 is provided in a cover part 18*a* so that, even after the assembling of the fiber optic module is completed, variable resistors on the PCB 30 can be adjusted through the cover opening 19. Since the cover part 18*a* is formed integrally with the upper frame 10 during molding thereof or is molded therewith at the same time in this way, there can be implemented a fiber optic module which is highly reliable and more economical. It will be noted that, even when the cover opening 19 shown in the eleventh aspect of the invention is applied to the tenth aspect of FIG. 11, the effects of the present invention can be ensured.

Figure 13A:
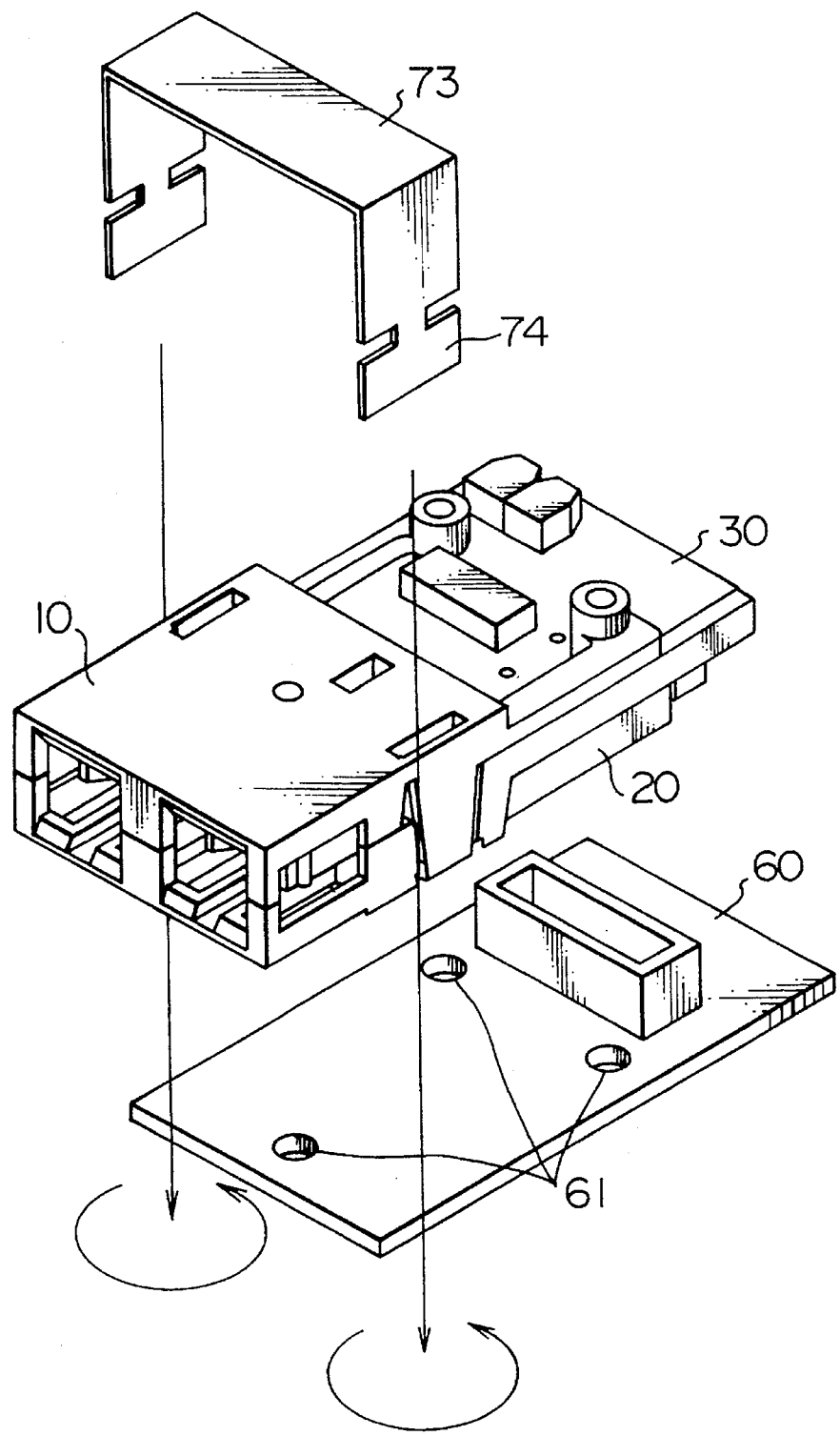
FIG. 13A is an exploded perspective view of a fiber optic module in accordance with a twelfth aspect of the present invention.

Shown in FIG. 13A is an exploded perspective view of a fiber optic module in accordance with a twelfth aspect of the present invention, in which an supporting plate 73 is used for fixing the fiber optic module to a mother PCB 60. The supporting plate 73 is provided with a fixing part 74 so that, when the fixing part 74 is rotated by an angle of about 90 degrees, the fixing part helps to fix the fiber optic module. The fixation of the fiber optic module is sufficient by means of the tapping screws 70 earlier given in the fourth aspect (refer to FIG. 5) or the pins 71 in the ninth aspect (refer to FIG. 10), but the additional use of the supporting plate 73 enables provision of more reliable fiber optic module. Further, when the supporting plate 73 is made of metallic material, the supporting plate 73 can have functions of protecting the PD module 40 from external electromagnetic noise and also of shielding electromagnetic noise radiated from the LD module 50 onto external elements. It will be appreciated that, although the supporting plate 73 has been made of iron alloy in the twelfth aspect of the present invention, iron, aluminum, aluminum alloy, gold, copper or copper alloy may be employed as the material of the supporting plate 73, with substantially the same or equivalent effects of the invention. It will also be noted that, though the supporting plate 73 has been mounted from the top of the fiber optic module to help to fix the fiber optic module to the mother board 60 in the twelfth aspect of the invention, the supporting plate 73 may be mounted from the bottom side of the mother board 60 to help to fix the fiber optic module to the mother board 60, with substantially the same effects of the invention.

Figure 13B:
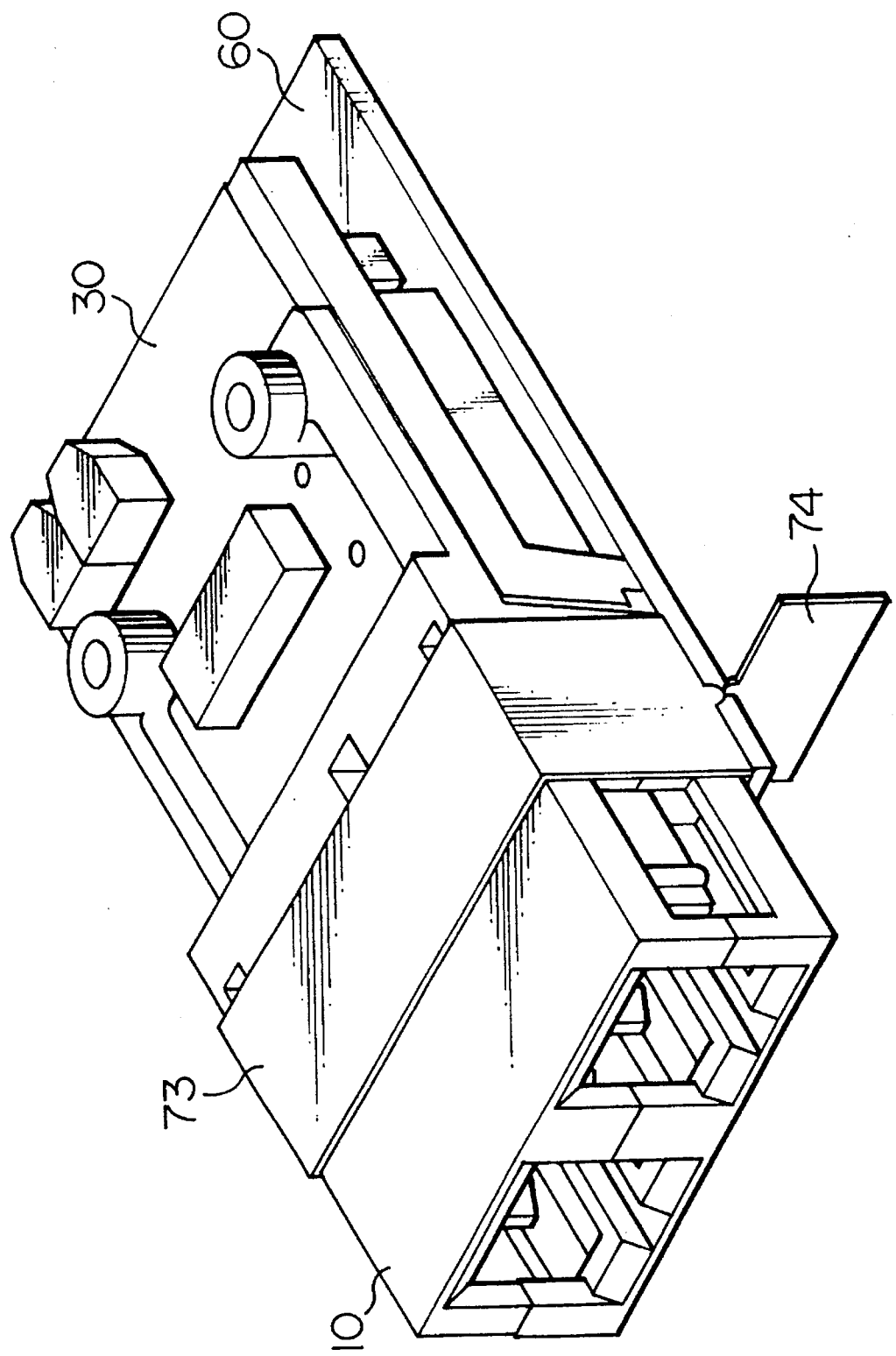
FIG. 13B shows a perspective view of the assembled fiber optic module of the twelfth aspect of the invention.

FIG. 13B shows a perspective view of the assembled fiber optic module of the twelfth aspect of the invention. As shown in FIG. 13B, the fiber optic module assembly including the PCB 30, the upper frame 10, the lower frame 20 and other components is assembled by being fastened to the mother board 60 first with the tapping screws 70 and other fasteners as shown in FIG. 5 then being mounted with the supporting plate 73 having fastening wings 74 at the both ends. The fastening wings 74 are twisted at about 90 degrees to fix the fiber optic module assembly on the mother board 73.

Figure 14:
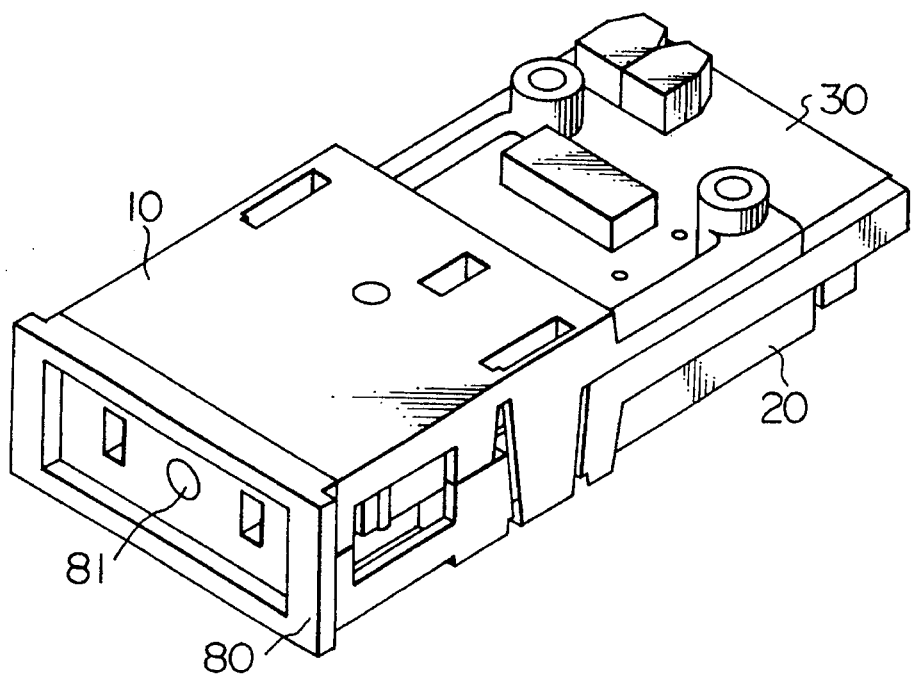
FIG. 14 is a perspective view of a fiber optic module in accordance with a thirteenth aspect of the present invention.

Referring to FIG. 14, there is shown a perspective view of a fiber optic module in accordance with a thirteenth aspect of the present invention. A module cap 80 is attached to the fiber optic module for preventing dust from invading into LD and PD modules in the non-operative mode (during shelf-keeping, transportation, etc.) of the present fiber optic module (i.e., an assembled combination of upper and lower frames 10 and 20 and a PCB 30).

Figure 15:
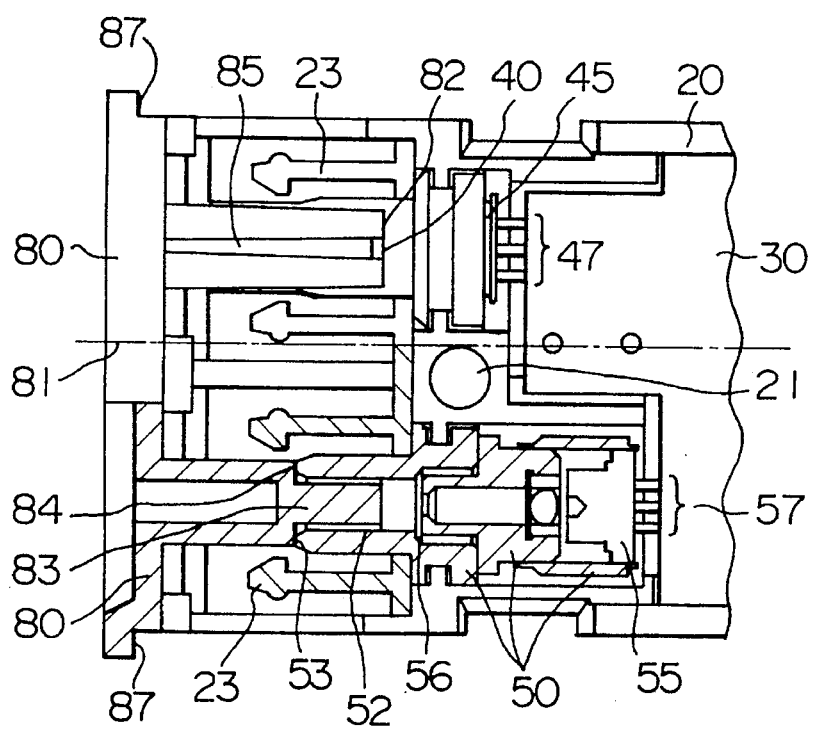
FIG. 15 is a plan view of the fiber optic module in accordance with the thirteenth aspect of the present invention.

Next, the module cap 80 will be detailed in connection with FIG. 15 showing in plan view the fiber optic module of the thirteenth aspect of the invention. For more detailed explanation of the module cap 80, parts of the LD module 50 are shown in section. In FIG. 15, and PD element 45 is fixed to a PD module 40 by bonding (or welding) or the like and an LD element 55 is fixed to the LD module 50 by welding (or bonding) or the like, so that the PD and LD modules 40 and 50 are temporarily physically or mechanically fixed to a lower frame 20 and electrically connected to the PCB 30 through PD and LD leads 47 and 57, respectively. The module cap 80, which is arranged not to contact with pawls 23 of the lower frame 20, is provided with cap projections 85 for holding the module cap 80 to the fiber optic module and also with a handler 87 for easy mounting and dismounting of the module cap 80 to and from the fiber optic module. When the module cap 80 is mounted to the fiber optic module, cap end surfaces 82 are not brought into contact with a ferule abutment surface 56 of the LD module 50 and module abutment surfaces 84 of the module cap 80 is brought into contact with an LD module end surface 53 of the LD module 50, thereby preventing invasion of dust into an LD module opening 52. Further, the diameter of a cap projection 83 is designed to be sufficiently smaller than the diameter of the LD module opening 52, so that the module cap 80 can be easily mounted and dismounted while preventing dust or foreign matter from generating in the opening 52 during the mounting and dismounting of the module cap 80.

Figure 16:
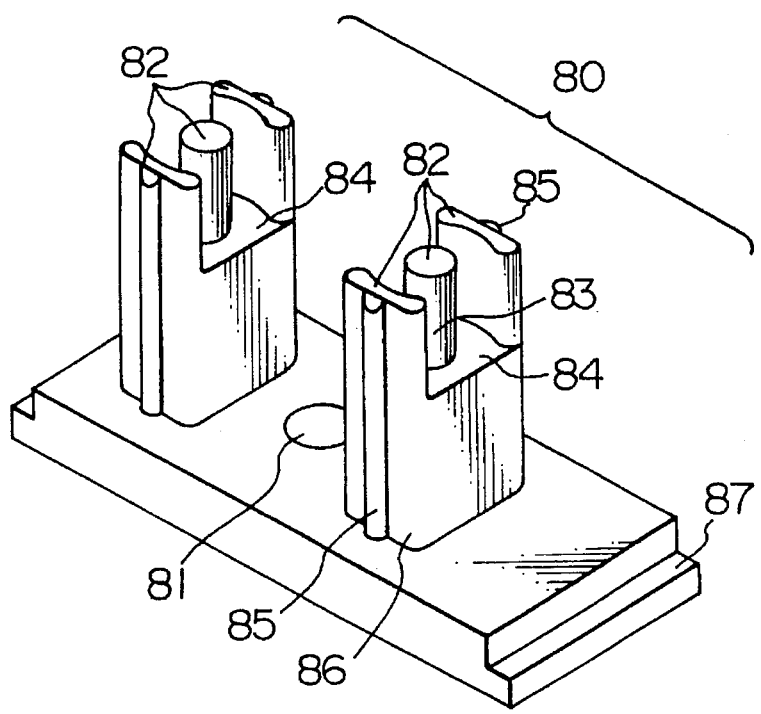
FIG. 16 is a perspective view of a module cap of the fiber optic module in accordance with the thirteenth aspect of the present invention.
Figure 17:
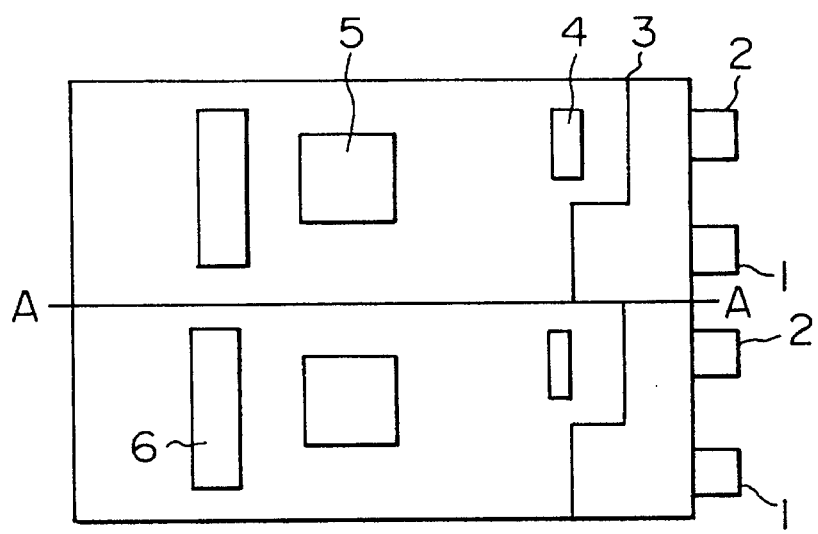
FIG. 17 is a plan view of a prior art fiber optic module.
Figure 18:
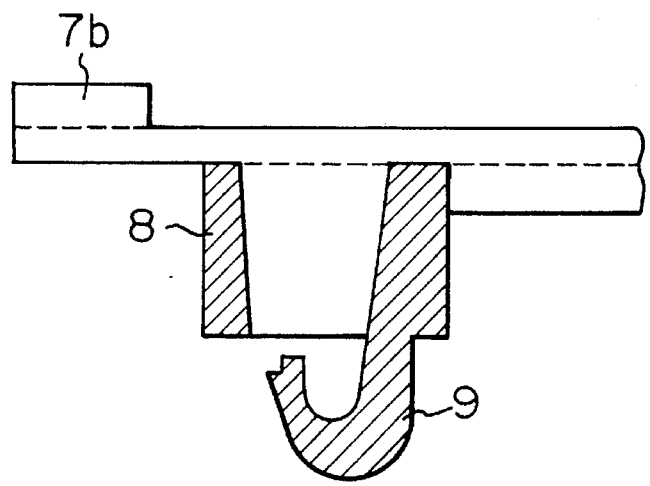
FIG. 18 is a cross-sectional view of a major part of a lower frame for the prior art fiber optic module.
Figure 19:
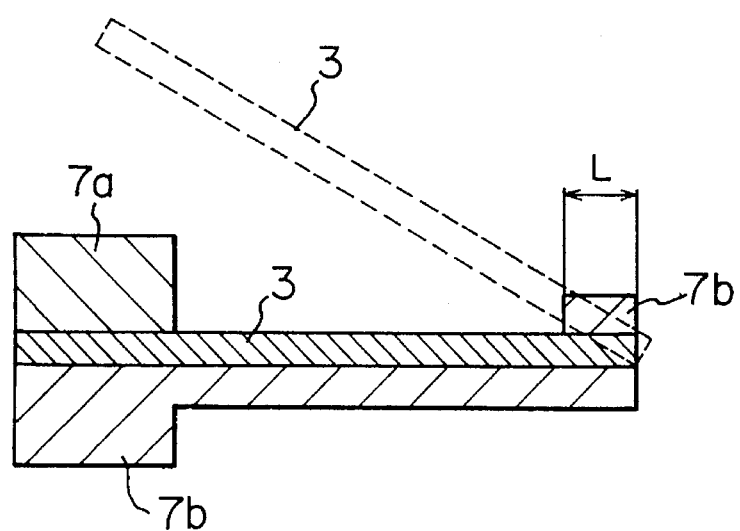
FIG. 19 is a cross-sectional view of a major part of how to hold a circuit board of the prior art fiber optic module.

Shown in FIG. 16 is a perspective view of the fiber optic module in accordance with the thirteenth aspect for clearer illustration of the module cap 80. Elastic parts 86 ranging from the module abutment surfaces 84 to the cap end surfaces 82 for preventing dust from invading into the LD and PD modules 50 and 40 are elastically deformed through the cap projections 85, so that the module cap 80 is held to the fiber optic module. The module cap 80 has a cap opening 81 for parts acceptance test. For the material of the module cap 80, relatively soft polyethylene is selected, but the present invention is not limited to the specific example and any material may be employed so long as the material is resin.

As has been explained in the foregoing, in accordance with the present invention, when there is provided a compact fiber optic module which is made to be 25.4 mm wide, 50.8 mm long and 11.5 mm high and which is provided with indispensable minimum functions, the fiber optic module can obtain the following features 1) to 6).

1) Since transfer of electric signals is carried out in the form of serial data, the number of signal lines can be made as small as 22, the configuration of the connector can be made small and further the need for such semiconductor ICs for serial/parallel conversion can be eliminated. Thus, not only the present invention can follow a recent tendency of the rapid downsizing movement of host computer but the design flexibility of mother board in system manufacturers can also be remarkably expanded.

2) The fixation of the fiber optic module to the mother board in the present invention is achieved by means of the tapping screws passed through the respective openings and only 3 of small holes as the openings of the mother board is sufficient. Therefore, the design flexibility of the mother board for the system manufacturer can be remarkably expanded. Further, since the fiber optic module of the invention is structured so that force loads caused by the mounting and dismounting of the optical fiber are all imposed on the tapping screws, electrical lead connection failure can be completely avoided and thus a highly reliable fiber optic module can be realized.

In addition, since the invention is arranged so that the 3 openings accommodate variations in the dimensional accuracies of parts, stresses to be applied to the leads of the respective modules can be removed and it becomes unnecessary to increase the accuracies of the parts and to manage the parts (such as parts acceptance test), thereby realizing an inexpensive fiber optic module.

3) When the connector in the fiber optic module of the present invention is of a surface mounting type, manual works including direct connection of the signal line to the mother board by soldering can be eliminated and thus the cost of the fiber optic module can be made low.

4) When the printed circuit board is provided at its front side with holding means for holding the circuit board by a snap-fit mechanism of the upper and lower frames and at its rear side with holding means for holding the circuit board by the upper frame having a very weak elastic property, the circuit board can be prevented from being warped and therefore can be made remarkably high in reliability. Further, the need for the sufficient circuit board holding length L, which has been necessary to be long enough in the prior art, can be eliminated and thus a compact fiber optic module can be implemented.

5) The circuit board is covered with the upper and lower frames and/or the cover, therefore, worker's handling of the fiber optic module for assembly or inspection can be facilitated, the assembling and inspection efficiencies of the fiber optic module can be enhanced, the fiber optic module can be manufactured inexpensively with a high reliability while preventing the electrostatic destruction of the circuit board.

6) When an inexpensive module cap having a simple shape is attached to the fiber optic module, the cap can prevent dust from invading into the fiber optic module during a long-term of shelf-keeping time, any improper connection between the optical fiber and module can be avoided, and thus the fiber optic module can be made remarkably high in reliability.

In this way, the present invention has high practical effects.

What is claimed is:

1. A fiber optic module comprising:

a connector for connection with a mother board;

laser diode electric signal conversion means for converting serial data received from said mother board to an laser diode electric signal for a laser diode;

an laser diode module for converting said laser diode electric signal to an laser diode optical signal;

a photo diode module for converting a photodiode optical signal to a photo diode electric signal;

photo diode electric signal conversion means for converting said photo diode electric signal to photo diode serial data;

a circuit board for carrying thereon said connector, said laser diode electric signal conversion means, said laser diode module and said photo diode module; and first and second frames for holding said circuit board, said laser diode module and said photo diode module, wherein said connector is of a surface mounting type.

2. A fiber optic module as set forth in claim 1, wherein leads of said laser diode and photo diode modules are connected to a surface of said circuit board provided thereon with said connector.

3. A fiber optic module as set forth in claim 2, further comprising an laser diode variable resistor for adjusting a drive current of said laser diode module and wherein said laser diode variable resistor is provided on a surface of said circuit board opposed to said surface having said connector thereon.

4. A fiber optic module as set forth in claim 2, further comprising a photo diode variable resistor for detecting a signal of said photo diode module and wherein said photo diode variable resistor is provided on a surface of said circuit board opposed to said surface having said connector thereon.

5. A fiber optic module as set forth in claim 1, wherein said photo diode electric signal conversion means includes a plurality of semiconductor integrated circuits.

6. A fiber optic module as set forth in claim 1, wherein said circuit board measures 17 mm through 25.4 mm wide, 30 mm through and 50 mm long.

7. A fiber optic module comprising:

a connector for connection with a mother board;

laser diode electric signal conversion means for converting serial data received from said mother board to an laser diode electric signal for a laser diode;

an laser diode module for converting said laser diode electric signal to an laser diode optical signal;

a photo diode module for converting a photodiode optical signal to a photo diode electric signal;

photo diode electric signal conversion means for converting said photo diode electric signal to photo diode serial data;

a circuit board for carrying thereon said connector, said laser diode electric signal conversion means, said laser diode module and said photo diode module; and first and second frames for holding said circuit board, said laser diode module and said photo diode module, wherein outline dimensions of said fiber optic module are 19 mm through 25.4 mm wide, 45 mm through 65 mm high and 9 mm through 25.4 mm high.

8. A fiber optic module as set forth in claim 7, further comprising a casing, said casing comprising said first and second frames forms an outside casing.

9. A fiber optic module as set forth in claim 7, wherein said first and second frames are made of resin material.

10. A fiber optic module comprising:

a connector for connection with a mother board;

laser diode electric signal conversion means for converting serial data received from said mother board to an laser diode electric signal for a laser diode;

an laser diode module for converting said laser diode electric signal to an laser diode optical signal;

a photo diode module for converting a photodiode optical signal to a photo diode electric signal;

photo diode electric signal conversion means for converting said photo diode electric signal to photo diode serial data;

a circuit board for carrying thereon said connector, said laser diode electric signal conversion means, said laser diode module and said photo diode module; and first and second frames for holding said circuit board, said laser diode module and said photo diode module, wherein said module comprises mounting means for mounting said first and second frames to said mother board.

11. A fiber optic module as set forth in claim 10, wherein said mounting means includes a screw.

12. A fiber optic module as set forth in claim 11, further comprising a first frame openings provided in said first frame, a second frame openings provided in said second frame, a circuit board openings provided in said circuit board, and a mother board openings provided in said mother board, and wherein screws are inserted into said first openings, second frame openings, said circuit board openings and said mother board openings to cause said first frame, said second frame, said circuit board and said mother board to be mutually fixed.

13. A fiber optic module as set forth in claim 12, wherein said first frame openings is smaller than said second frame openings and said circuit board openings and said mother board openings have substantially the same diameter as said second frame opening.

14. A fiber optic module as set forth in claim 10, wherein said screws have an effective diameter of 1.3 mm or more.

15. A fiber optic module as set forth in claim 12, wherein 3 of said first frame openings are provided in said first frame and said first frame openings are arranged to form a substantially isosceles triangle.

16. A fiber optic module as set forth in claim 12, wherein said first frame openings are used also as reference holes for parts inspection of said first frame and said second frame openings are used also as reference holes for parts inspection of said second frame.

17. A fiber optic module as set forth in claim 11, wherein said screws are tapping screws.

18. A fiber optic module as set forth in claim 10, wherein pins erected on at least one of said first and second frames are used as said mounting means.

19. A fiber optic module as set forth in claim 18, wherein pins erected only on said second frame are used as said mounting means.

20. A fiber optic module as set forth in claim 19, further comprising first frame openings provided in said first frame, a circuit board openings provided in said circuit board, and a mother board openings provided in said mother board, and wherein screws are inserted into said first frame openings, said circuit board openings and said mother board openings to cause said first frame, said circuit board and said mother board to be mutually fixed.

21. A fiber optic module as set forth in claim 20, wherein said first frame openings are larger than a diameter of said pin and said circuit board openings and said mother board openings have substantially the same diameter as said first frame openings.

22. A fiber optic module as set forth in claim 19, wherein said pin has a diameter of 1.3 mm or more.

23. A fiber optic module as set forth in claim 19, wherein said pin is made of metallic material.

24. A fiber optic module as set forth in claim 19, wherein said pin is integrally formed with said second frame or press fitted therein.

25. A fiber optic module as set forth in claim 20, wherein 3 of said first frame openings are provided in said first frame and said first frame openings are arranged to form a substantially isosceles triangle.

26. A fiber optic module as set forth in claim 20, wherein said first frame openings are used also as reference holes for parts inspection of said first frame and said pins are used also as reference holes for parts inspection of said second frame.

27. A fiber optic module comprising:

a connector for connection with a mother board;

laser diode electric signal conversion means for converting serial data received from said mother board to an laser diode electric signal for a laser diode;

an laser diode module for converting said laser diode electric signal to an laser diode optical signal;

a photo diode module for converting a photodiode optical signal to a photo diode electric signal;

photo diode electric signal conversion means for converting said photo diode electric signal to photo diode serial data;

a circuit board for carrying thereon said connector, said laser diode electric signal conversion means, said laser diode module and said photo diode module; and first and second frames for holding said circuit board, said laser diode module and said photo diode module, wherein said circuit board is temporarily fixed to at least one of said first and second frames.

28. A fiber optic module as set forth in claim 27, wherein said temporary fixing means is a snap-fit mechanism.

29. A fiber optic module as set forth in claim 28, wherein said circuit board is temporarily fixed at an end thereof by said snap-fit mechanism.

30. A fiber optic module as set forth in claim 27, wherein an elastic arm is provided to at least one of said first and second frames and said circuit board is temporarily fixed to the other frame by said elastic arm.

31. A fiber optic module as set forth in claim 27, wherein said circuit board is temporarily fixed at a front part thereof by a snap-fit mechanism and said circuit board is temporarily fixed to the other frame at a rear part thereof by an elastic arm.

32. A fiber optic module comprising:

a connector for connection with a mother board;

laser diode electric signal conversion means for converting serial data received from said mother board to an laser diode electric signal for a laser diode;

an laser diode module for converting said laser diode electric signal to an laser diode optical signal;

a photo diode module for converting a photodiode optical signal to a photo diode electric signal;

photo diode electric signal conversion means for converting said photo diode electric signal to photo diode serial data;

a circuit board for carrying thereon said connector, said laser diode electric signal conversion means, said laser diode module and said photo diode module; and first and second frames for holding said circuit board, said laser diode module and said photo diode module, wherein said module further comprises supporting means for tightening to fix said first and second frames and said mother board from their outer periphery.

33. A fiber optic module as set forth in claim 32, wherein said supporting means is made of metallic plate.

34. A fiber optic module as set forth in claim 33, wherein said metallic plate is provided in its both ends with recesses and said recesses are rotated to tighteningly fix said metallic plate.

35. A fiber optic module as set forth in claim 32, wherein said supporting means is positioned at a position opposed to said laser diode and photo diode modules.

36. A fiber optic module comprising:

a connector for connection with a mother board;

laser diode electric signal conversion means for converting serial data received from said mother board to an laser diode electric signal for a laser diode;

an laser diode module for converting said laser diode electric signal to an laser diode optical signal;

a photo diode module for converting a photodiode optical signal to a photo diode electric signal;

photo diode electric signal conversion means for converting said photo diode electric signal to photo diode serial data;

a circuit board for carrying thereon said connector, said laser diode electric signal conversion means, said laser diode module and said photo diode module; and first and second frames for holding said circuit board, said laser diode module and said photo diode module, wherein said module further includes a cover for covering an externally exposed part of said circuit board therewith.

37. A fiber optic module as set forth in claim 36, wherein said cover is made of resin material.

38. A fiber optic module as set forth in claim 36, wherein said cover is made of metallic material.

39. A fiber optic module as set forth in claim 36, wherein said cover is made in the form of said first frame.

40. A fiber optic module as set forth in claim 36, wherein said cover is provided therein with an opening.

41. A fiber optic module comprising:

a connector for connection with a mother board;

laser diode electric signal conversion means for converting serial data received from said mother board to an laser diode electric signal for a laser diode;

an laser diode module for converting said laser diode electric signal to an laser diode optical signal;

a photo diode module for converting a photodiode optical signal to a photo diode electric signal;

photo diode electric signal conversion means for converting said photo diode electric signal to photo diode serial data;

a circuit board for carrying thereon said connector, said laser diode electric signal conversion means, said laser diode module and said photo diode module; and first and second frames for holding said circuit board, said laser diode module and said photo diode module, wherein said module further comprises indication parts indicative of a safety certification and a place of production provided respectively onto said first and second frames.

42. A fiber optic module as set forth in claim 41, wherein said indication part provided onto said first frame is opposed to said indication part provided onto said second frame.

43. A fiber optic module as set forth in claim 42, wherein said first and second frames have a recess and said indication parts are provided to said recesses.

44. A fiber optic module as set forth in claim 41, wherein said indication parts are seal labels.

45. A fiber optic module as set forth in claim 41, wherein said indication parts are provided integrally to said first and second frames respectively.

46. A fiber optic module comprising:

a connector for connection with a mother board;

laser diode electric signal conversion means for converting serial data received from said mother board to an laser diode electric signal for a laser diode;

an laser diode module for converting said laser diode electric signal to an laser diode optical signal;

a photo diode module for converting a photodiode optical signal to a photo diode electric signal;

photo diode electric signal conversion means for converting said photo diode electric signal to photo diode serial data;

a circuit board for carrying thereon said connector, said laser diode electric signal conversion means, said laser diode module and said photo diode module; and first and second frames for holding said circuit board, said laser diode module and said photo diode module, wherein a data transmission rate of said optical signal is 130 Mbits/s or more.

47. A fiber optic module as set forth in claim 46, wherein the data transmission rate of said optical signal is 200 Mbits/s or more.

48. A fiber optic module as set forth in claim 46, wherein the data transmission rate of said optical signal is 500 Mbits/s or more.

49. A fiber optic module as set forth in claim 46, wherein the data transmission rate of said optical signal is 1000 Mbits/s or more.

50. A fiber optic module comprising:

a connector for connection with a mother board;

laser diode electric signal conversion means for converting serial data received from said mother board to an laser diode electric signal for a laser diode;

an laser diode module for converting said laser diode electric signal to an laser diode optical signal;

a photo diode module for converting a photodiode optical signal to a photo diode electric signal;

photo diode electric signal conversion means for converting said photo diode electric signal to photo diode serial data;

a circuit board for carrying thereon said connector, said laser diode electric signal conversion means, said laser diode module and said photo diode module; and first and second frames for holding said circuit board, said laser diode module and said photo diode module, wherein said fiber optic module further includes a module cap to be inserted into light outlet and inlet openings defined by said first and second frames along a light inlet and outlet direction.

51. A fiber optic module as set forth in claim 50, wherein said module cap has cap fixing means engaged with part of said first and second frames and fixed to at least one of said first and second frames.

52. A fiber optic module comprising:

a connector for connection with a mother board;

laser diode electric signal conversion means for converting serial data received from said mother board to an laser diode electric signal for a laser diode;

an laser diode module for converting said laser diode electric signal to an laser diode optical signal;

a photo diode module for converting a photodiode optical signal to a photo diode electric signal;

photo diode electric signal conversion means for converting said photo diode electric signal to photo diode serial data;

a circuit board for carrying thereon said connector, said laser diode electric signal conversion means, said laser diode module and said photo diode module; and first and second frames for holding said circuit board, said laser diode module and said photo diode module, wherein said fiber optic module includes a shielding member for shielding at least one of said laser diode and photo diode modules.

53. A fiber optic module as set forth in claim 52, wherein a shielding plate for exclusive use of said laser diode module and a shielding plate for exclusive use of said photo diode module.

54. A fiber optic module as set forth in claim 52, wherein at least one of said first and second frames is provided integrally with a shielding plate.

55. A fiber optic module comprising:

a connector for connection with a mother board;

laser diode electric signal conversion means for converting serial data received from said mother board to an laser diode electric signal for a laser diode;

an laser diode module for converting said laser diode electric signal to an laser diode optical signal;

a photo diode module for converting a photodiode optical signal to a photo diode electric signal;

photo diode electric signal conversion means for converting said photo diode electric signal to photo diode serial data;

a circuit board for carrying thereon said connector, said laser diode electric signal conversion means, said laser diode module and said photo diode module; and first and second frames for holding said circuit board, said laser diode module and said photo diode module, wherein elastic pawls to be engaged with an optical fiber plug are provided to at least one of said first and second frames and said pawls are provided at their root parts with first projections extended toward the other frame.

56. A fiber optic module as set forth in claim 55, wherein second projections for protecting said first projections are provided to an opposite frame being opposite to the frame provided with said first projections.

57. A fiber optic module as set forth in claim 55, wherein said first and second frames and said pawls are made of resin material.

58. A fiber optic module comprising:

a connector for connecting with a mother board of a computer;

a first semiconductor integral circuit for converting a first parallel data provided from the mother board into a first serial data for a laser diode;

a second semiconductor integral circuit for converting said first serial data for the laser diode converted by said first semiconductor integral circuit into a first electrical signal;

a laser diode module including a laser diode for converting said first electrical signal for the laser diode into a first optical signal of the laser diode;

a photodiode module including a photodiode for converting a second optical signal received by said photodiode into a second electrical signal of the photodiode;

a third semiconductor integral circuit for converting said second electrical signal of the photodiode into a second serial data of the photodiode;

a fourth semiconductor integral circuit for converting said second serial data of the photodiode converted by said third semiconductor integral circuit into a second parallel data;

a circuit board for furnishing with said connector, said first semiconductor integral circuit, said second semiconductor integral circuit, said third semiconductor integral circuit and said fourth semiconductor integral circuit;

a first shielding plate for electrically shielding said laser diode module;

a second shielding plate for electrically shielding said photo diode module;

a first frame for holding said circuit board, said laser diode module and said photo diode module; and a second frame for cooperating with said first frame to hold said circuit board, said laser diode module and said photo diode module.

* * * * *